(12) United States Patent
Kim et al.

(10) Patent No.: US 11,442,580 B2
(45) Date of Patent: Sep. 13, 2022

(54) SCREEN CONFIGURATION METHOD, ELECTRONIC DEVICE, AND STORAGE MEDIUM

(71) Applicant: Samsung Electronics Co., Ltd., Suwon-si (KR)

(72) Inventors: Myung-Sik Kim, Suwon-si (KR); Taik-Heon Rhee, Seoul (KR); Kwang-Min Byeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/857,549

(22) Filed: Apr. 24, 2020

(65) Prior Publication Data

US 2020/0249778 A1 Aug. 6, 2020

Related U.S. Application Data

(63) Continuation of application No. 14/950,704, filed on Nov. 24, 2015, now abandoned.

(30) Foreign Application Priority Data

Nov. 27, 2014 (KR) .................. 10-2014-0167572

(51) Int. Cl.
*G06F 3/042* (2006.01)
*G06F 3/04886* (2022.01)
(Continued)

(52) U.S. Cl.
CPC .............. *G06F 3/042* (2013.01); *G06F 3/011* (2013.01); *G06F 3/041* (2013.01); *G06F 3/046* (2013.01);
(Continued)

(58) Field of Classification Search
CPC .......... G06F 3/042; G06F 3/011; G06F 3/016; G06F 3/041; G06F 3/046; G06F 3/04886;
(Continued)

(56) References Cited

U.S. PATENT DOCUMENTS 6,971,072 B1 11/2005 Stein
7,653,883 B2 1/2010 Hotelling et al.
(Continued)

FOREIGN PATENT DOCUMENTS

CN 1766809 A 5/2006
CN 101840284 A 9/2010
(Continued)

OTHER PUBLICATIONS

Korean Office Action dated Feb. 7, 2020, issued in a counterpart Korean Application No. 10-2014-0167572.
(Continued)

*Primary Examiner* — Fred Tzeng
(74) *Attorney, Agent, or Firm* — Jefferson IP Law, LLP

(57) ABSTRACT

A method of configuring a screen of an electronic device is provided. The method includes acquiring a distance between the electronic device and an object for performing an input into the electronic device, and displaying at least one of an input screen and an output screen on a display of the electronic device based on the acquired distance.

14 Claims, 30 Drawing Sheets

(51) Int. Cl.
*G06F 3/01* (2006.01)
*G06F 3/041* (2006.01)
*G06F 3/046* (2006.01)
*G04G 21/08* (2010.01)
(52) U.S. Cl.
CPC ......... *G06F 3/04886* (2013.01); *G04G 21/08* (2013.01); *G06F 2203/04101* (2013.01)
(58) Field of Classification Search
CPC ............ G06F 3/04817; G06F 3/03545; G06F 3/0416; G06F 3/04883; G06F 3/044; G06F 3/0488; G06F 3/04842; G06F 3/1446; G06F 3/0426; G06F 3/005; H04N 13/156; H04N 13/243; G09G 3/003; G06T 7/74
USPC .......................................................... 345/175
See application file for complete search history.

(56) References Cited

U.S. PATENT DOCUMENTS

| | | | |
|---|---|---|---|
| 8,195,220 | B2 | 6/2012 | Kim et al. |
| 8,203,577 | B2 | 6/2012 | Hoover |
| 8,624,927 | B2 | 1/2014 | Ohmori et al. |
| 9,041,691 | B1* | 5/2015 | Haskin .................. G03B 21/60 345/175 |
| 9,411,162 | B2* | 8/2016 | Tanaka .................. G09G 3/003 |
| 9,569,103 | B2 | 2/2017 | Kim |
| 9,715,113 | B2* | 7/2017 | Yajima ...................... G06T 7/74 |
| 9,857,971 | B2* | 1/2018 | Chang .................. G06F 3/0426 |
| 9,946,345 | B2* | 4/2018 | Park ........................ G06F 3/016 |
| 10,019,055 | B2 | 7/2018 | Miller |
| 10,331,320 | B2* | 6/2019 | Sudo .................. H04N 5/232939 |
| 2006/0161871 | A1 | 7/2006 | Hotelling et al. |
| 2009/0002326 | A1* | 1/2009 | Pihlaja .................. G06F 3/0488 345/173 |
| 2009/0207154 | A1 | 8/2009 | Chino |
| 2009/0262086 | A1* | 10/2009 | Chen ..................... G06F 3/0488 345/173 |
| 2009/0289914 | A1 | 11/2009 | Cho |
| 2010/0238107 | A1 | 9/2010 | Ohki et al. |
| 2012/0054355 | A1* | 3/2012 | Arrasvuori ............ G06F 3/1446 709/229 |
| 2013/0076688 | A1* | 3/2013 | Tokutake ................ G06F 3/044 345/174 |
| 2013/0162571 | A1* | 6/2013 | Tam ..................... G06F 3/04817 345/173 |
| 2013/0215235 | A1* | 8/2013 | Russell ................ H04N 13/243 348/47 |
| 2013/0234962 | A1 | 9/2013 | Chen et al. |
| 2013/0241955 | A1* | 9/2013 | Tamaru ................ H04N 13/156 345/633 |
| 2013/0257692 | A1 | 10/2013 | Yang et al. |
| 2013/0257748 | A1* | 10/2013 | Ambrus .................. G06F 3/005 345/173 |
| 2013/0335303 | A1 | 12/2013 | Maciocci et al. |
| 2014/0132519 | A1* | 5/2014 | Chun .................. G06F 3/04886 345/168 |
| 2014/0210756 | A1* | 7/2014 | Lee ....................... G06F 3/0416 345/173 |
| 2014/0237412 | A1 | 8/2014 | Yoon et al. |
| 2014/0320434 | A1* | 10/2014 | Pantel .................. G06F 3/04883 345/173 |
| 2014/0354531 | A1 | 12/2014 | Foreman |
| 2015/0009155 | A1* | 1/2015 | Tsao .................... G06F 3/03545 345/173 |
| 2015/0109224 | A1 | 4/2015 | Kim et al. |
| 2015/0341435 | A1 | 11/2015 | Hamada et al. |
| 2016/0005233 | A1* | 1/2016 | Fraccaroli .......... G02B 27/0172 345/633 |
| 2016/0253044 | A1* | 9/2016 | Katz .................... G06F 3/04842 345/156 |

FOREIGN PATENT DOCUMENTS

| | | |
|---|---|---|
| CN | 103324425 A | 9/2013 |
| CN | 104007923 A | 8/2014 |
| EP | 2 634 680 A1 | 9/2013 |
| EP | 2 777 484 A2 | 9/2014 |
| JP | 08-006708 | 1/1996 |
| JP | 2008047027 A | 2/2008 |
| JP | 2013149049 A | 8/2013 |
| JP | 2013232159 A | 11/2013 |
| JP | 2014081733 A | 5/2014 |
| JP | 2014-157413 A | 8/2014 |
| KR | 10-2009-0089254 A | 8/2009 |
| KR | 10-2009-0121033 A | 11/2009 |
| KR | 10-2013-0022996 A | 3/2013 |
| KR | 10-2014-0104822 A | 8/2014 |
| KR | 0-2015-0044757 A | 4/2015 |

OTHER PUBLICATIONS

Chinese Office Action dated May 27, 2020, issued in a counterpart Chinese Application No. 201510848767.4.
Chinese Office Action dated Aug. 5, 2019, issued in Chinese Patent Application No. 201510848767.4.
International Search Report dated Mar. 3, 2016, issued in an International Application No. PCT/KR2015/012716.
Korean Office Action dated May 3, 2021, issued in a counterpart Korean Application No. 10-2020-0113766.
Korean Office Action dated Dec. 1, 2020, issued in a counterpart Korean Application No. 10-2020-0113766.

* cited by examiner

SCREEN CONFIGURATION METHOD, ELECTRONIC DEVICE, AND STORAGE MEDIUM

CROSS-REFERENCE TO RELATED APPLICATION(S)

This application is a continuation of prior application Ser. No. 14/950,704, filed on Nov. 24, 2015, and was based on and claimed priority under 35 U.S.C. § 119(a) of a Korean patent application number 10-2014-0167572, filed on Nov. 27, 2014, in the Korean Intellectual Property Office, the disclosure of which is incorporated by reference herein in its entirety.

TECHNICAL FIELD

The present disclosure relates to a screen configuration of an electronic device. More particularly, the present disclosure relates to a screen configuration associated with an input screen and an output screen.

BACKGROUND

Recently, technologies associated with portable electronic devices such as a smart phone, a personal digital assistant (PDA), or a portable multimedia player (PMP) are actively developed. In order to increase portability, a display of a portable electronic device may be smaller than a display of a general electronic device. Particularly, a wearable device, for example, a watch type wearable device may have a smaller display. Further, an electronic device having a small display may display both an object for input such as a keyboard and an object for output such as a chatting history.

The above information is presented as background information only to assist with an understanding of the present disclosure. No determination has been made, and no assertion is made, as to whether any of the above might be applicable as prior art with regard to the present disclosure.

SUMMARY

When an electronic device having a small display simultaneously displays an object for input and an object for output, the object for input may be displayed in a small form. A user may have difficulty in controlling the object for input, which is displayed in a small form. Further, the electronic device, which provides an input means such as a keyboard, for example, a glasses type wearable electronic device or a virtual reality service providing device requires a method of easily controlling the input means.

Aspects of the present disclosure are to address at least the above-mentioned problems and/or disadvantages and to provide at least the advantages described below. Accordingly, an aspect of the present disclosure is to provide a method and an apparatus for configuring a screen to solve the above described problems or other problems.

In accordance with an aspect of the present disclosure, a method of configuring a screen of an electronic device is provided. The method includes acquiring a distance between the electronic device and an object for performing an input into the electronic device (i.e. a user's finger, a stylus or some other form of object suitable for performing a user input to the electronic device), and displaying at least one of an input screen and an output screen on a display of the electronic device based on the acquired distance.

In accordance with some examples of the present disclosure the displaying of the at least one of the input screen and the output screen comprises displaying the output screen when it is determined that the acquired distance is greater than or equal to a first threshold distance.

In accordance with some examples of the present disclosure the displaying of the at least one of the input screen and the output screen comprises displaying the input screen when it is determined that the acquired distance is less than a first threshold distance.

In accordance with some examples of the present disclosure, the method further comprises updating the first threshold distance to a second threshold distance when it is determined that the acquired distance is less than the first threshold distance.

In accordance with some examples of the present disclosure, the method further comprises when it is determined that the acquired distance is less than the second threshold distance, continuing the displaying of the input screen.

In accordance with some examples of the present disclosure, the method further comprises when it is determined that the acquired distance is greater than or equal to the second threshold distance, switching from displaying the input screen to displaying the output screen.

In accordance with some examples of the present disclosure, the method further comprises updating the second threshold distance to the first threshold distance when it is determined that the acquired distance is greater than or equal to the second threshold distance.

In accordance with some examples of the present disclosure, the method further comprises controlling at least one of a size, a form, a position, and an attribute of the input screen based on the distance between the electronic device and the object for performing an input into the electronic device.

In accordance with some examples of the present disclosure, the displaying of the at least one of the input screen and the output screen comprises displaying the output screen when it is determined that the acquired distance is equal to or less than a first threshold distance; and displaying the input screen when it is determined that the acquired distance is greater than the first threshold distance. For example, the switching between the screens may be based upon a distance between the user and the object as opposed to between the object and the electronic device.

In accordance with some examples of the present disclosure, the displaying of the at least one of the input screen and the output screen comprises displaying the output screen when it is determined that the acquired distance is not included in a first range; and displaying the input screen when it is determined that the acquired distance is included in the first range In accordance with another aspect of the present disclosure, an electronic device is provided. The electronic device includes a processor configured to acquire a distance between the electronic device and an input object for performing an input into the electronic device, and a display configured to display at least one of an input screen and an output screen on the electronic device based on the acquired distance.

In accordance with another aspect of the present disclosure, a storage medium having command stored therein is provided. The commands are configured to perform a process to be performed by at least one processor. The process includes acquiring a distance between the electronic device and an object for performing an input into the electronic device, and displaying at least one of an input screen and an output screen on a display of the electronic device based on the acquired distance.

In accordance with another aspect of the present disclosure, a method of configuring a screen of an electronic device is provided. The method includes configuring a first condition and a second condition for screen configuration of the electronic device, and displaying an input screen on an entire area of a display of the electronic device when the first condition is met and displaying an output screen on the entire area of the display of the electronic device when the second condition is met.

In accordance with another aspect of the present disclosure, an electronic device is provided. The electronic device includes a display, and a processor configured to display an input screen on an entire area of the display when a first condition is met, and to display an output screen on the entire area of the display when a second condition is met.

In accordance with another aspect of the present disclosure, a method of configuring a screen of an electronic device is provided. The method includes displaying an output screen on an entire area of a display of the electronic device, identifying that a distance between the electronic device and an object for performing an input into the electronic device is less than a threshold distance, and displaying an input screen on the entire area of the display.

In accordance with another aspect of the present disclosure, an electronic device is provided. The electronic device includes a display configured to display an output screen, and a processor configured to control to display an input screen on an entire area of the display when it is identified that a distance between the electronic device and an object for performing an input into the electronic device is less than a threshold distance.

Various embodiments of the present disclosure can provide an electronic device which displays at least one of an input screen and an output screen based on a distance between the electronic device and an input object such as a finger. Accordingly, when the user's finger is in the proximity of the electronic device, the input screen may be displayed. When the user's finger is far away from the electronic device, the output screen may be displayed. Therefore, the user convenience for the control can increase. For example the user may not be required to provide a separate input in order for an output screen to be replaced with an input or vice versa but instead an input screen may be switched to as the user performs the input since a user's finger coming into may be an indication that they wish to or are performing a user input proximity (i.e. the distance between the object and the electronic device is used to determine whether an input mode or an output mode should be entered into).

A glasses type wearable electronic device or a virtual reality service providing electronic device may determine whether to display an input screen based on a distance between a reference surface and an object such as a finger, thereby increasing the user convenience for the control.

Other aspects, advantages, and salient features of the disclosure will become apparent to those skilled in the art from the following detailed description, which, taken in conjunction with the annexed drawings, discloses various embodiments of the present disclosure.

Another aspect of the disclosure provides a computer program comprising instructions arranged, when executed, to implement a method and/or apparatus in accordance with any one of the above-described aspects. A further aspect provides machine-readable storage storing such a program.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
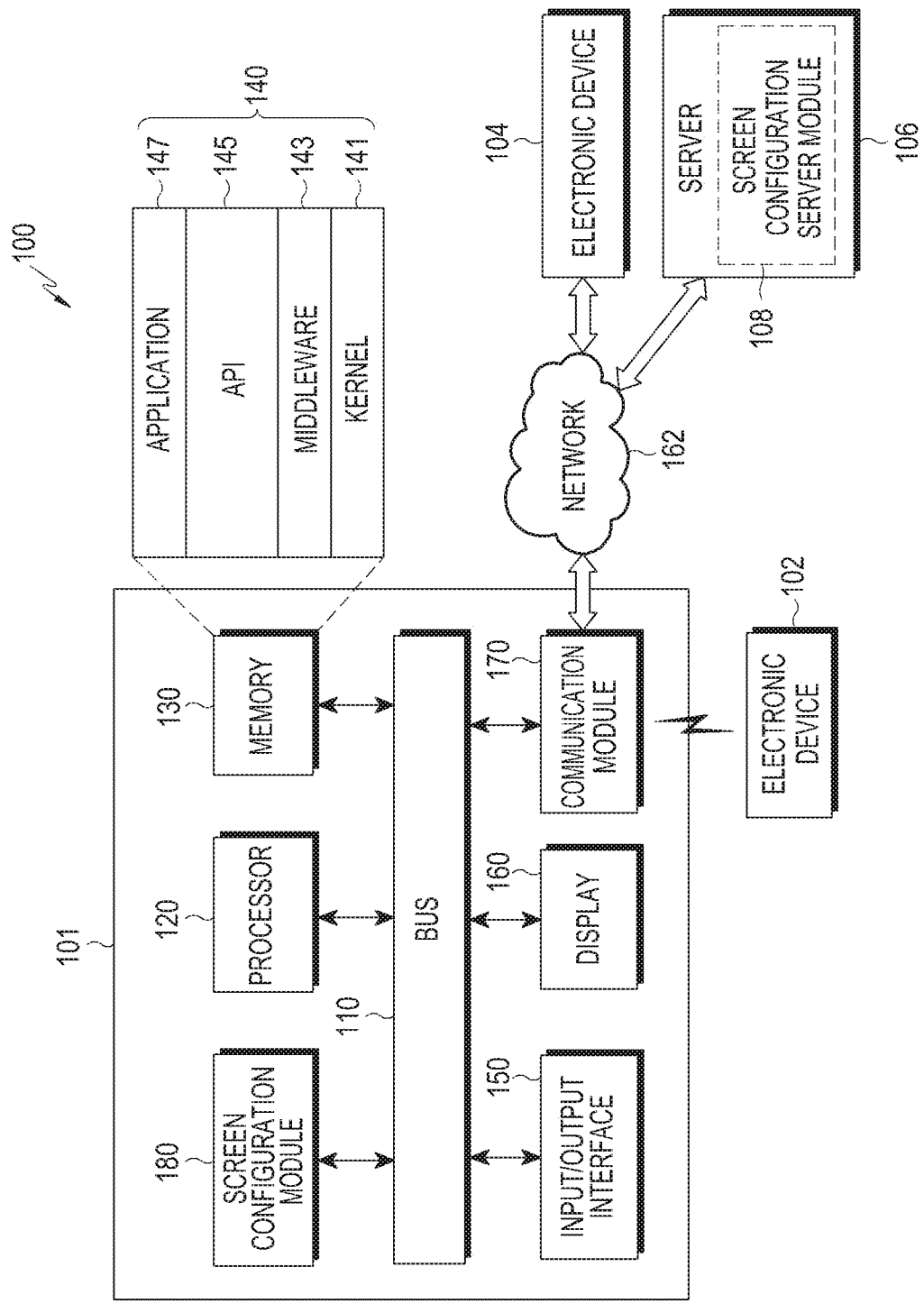
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

Furthermore, throughout the description and claims of this specification, the words "comprise" and "contain" and variations of the words, for example "comprising" and "comprises", means "including but not limited to", and is not intended to (and does not) exclude other moieties, additives, components, integers or steps.

Features, integers, characteristics, compounds, chemical moieties or groups described in conjunction with a particular aspect, embodiment or example of the disclosure are to be understood to be applicable to any other aspect, embodiment or example described herein unless incompatible therewith.

As used herein, the expression "A or B", "at least one of A and/or B", or "one or more of A and/or B" may include any or all possible combinations of items enumerated together. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the present disclosure may modify various components regardless of the order and/or the importance but does not limit the corresponding components. The above expressions are used merely for the purpose of distinguishing an element from the other elements. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

The terms used herein are merely for the purpose of describing particular embodiments of the present disclosure and are not intended to limit the scope of other embodiments. Unless defined otherwise, all terms used herein, including technical and scientific terms, have the same meaning as those commonly understood by a person skilled in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure. In some cases, even the term defined in the present disclosure should not be interpreted to exclude embodiments of the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer 3 (MP3) player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

According to various embodiments of the present disclosure, the electronic device may be a smart home appliance. The home appliance may include at least one of, for example, a television (TV), a digital versatile disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to an embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to various embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to various embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments of the present disclosure will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure.

Referring to FIG. 1, an electronic device 101 within a network environment 100 according to various embodiments is described. The electronic device 101 may include a bus 110, a processor 120, a memory 130, an input/output interface 150, a display 160, a communication module 170, and a screen configuration module 180. In any embodiment, the electronic device 101 may omit at least some of the above components or further include other components.

The bus 110 may include a circuit for connecting the components 120 to 180 and transmitting communication between the components (for example, control messages and/or data).

The processor 120 may include one or more of a CPU, an AP, and a communication processor (CP). The processor 120 may control, for example, one or more other components of the electronic device 101 and/or process an operation or data related to communication. The processor 120 may be called a controller or may include a controller as a part thereof.

The memory 130 may include a volatile memory and/or a non-volatile memory. The memory 130 may store, for example, commands or data related to at least one other component of the electronic device 101. According to an embodiment of the present disclosure, the memory 130 may store software and/or a program 140. The program 140 may include a kernel 141, middleware 143, an application programming interface (API) 145, and/or an application program (or "application") 147. At least some of the kernel 141, the middleware 143, and the API 145 may be referred to as an operating system (OS).

The kernel 141 may control or manage system resources (for example, the bus 110, the processor 120, or the memory 130) used for executing an operation or function implemented by other programs (for example, the middleware 143, the API 145, or the application program 147). Furthermore, the kernel 141 may provide an interface through which the middleware 143, the API 145, or the application program 147 may access individual components of the electronic device 101 to control or manage system resources.

The middleware 143 may serve as, for example, an intermediary such that the API 145 or the application program 147 communicate with the kernel 141 to transmit/receive data. Furthermore, in regard to task requests received from the application program 147, the middleware 143 may perform a control (for example, scheduling or load balancing) for the task requests using, for example, a method of assigning a priority for using the system resources (for example, the bus 110, the processor 120, or the memory 130) of the electronic device 101 to at least one application.

The API 145 is an interface by which the applications program 147 controls functions provided from the kernel 141 or the middleware 143, and may include, for example, at least one interface or function (for example, instructions) for file control, window control, image processing, or text control.

In the specification, the applications may be referred to as an application program.

The input/output interface 150 may serve as an interface which can transmit commands or data input from the user or another external device to other component(s) of the electronic device 101. Further, the input/output interface 150 may output commands or data received from another component(s) of the electronic device 101 to the user or another external device.

The display 160 may include, for example, a liquid crystal display (LCD), a light emitting diode (LED) display, an organic LED (OLED) display, a micro electro mechanical system (MEMS) display, or an electronic paper display. The display 160 may display various types of contents (for example, text, images, videos, icons, or symbols) for users. The display 160 may include a touch screen and receive, for example, a touch input, a gesture input, a proximity input, or a hovering input using an electronic pen or a user's body part.

The communication module 170 may configure communication between, for example, the electronic device and an external device (for example, a first external electronic device 102, a second external electronic device 104, or a server 106). For example, the communication module 170 may be connected to a network 162 through wireless or wired communication to communicate with the external device (for example, the external electronic device 104 or the server 106).

The wireless communication may include, for example, at least one of long term evolution (LTE), LTE advanced (LTE-A), code division multiple access (CDMA), wideband CMDA (WCDMA), universal mobile telecommunications system (UMTS), wireless broadband (WiBro), and global system for mobile communications (GSM) as a cellular communication protocol. The wired communication may include at least one of, for example, a universal serial bus (USB), a high definition multimedia interface (HDMI), recommended standard 232 (RS-232), and a plain old telephone service (POTS). The network 162 may include at least one of communication networks such as a computer network (for example, a local area network (LAN) or a wide area network (WAN)), the Internet, and a telephone network.

Each of the first and second external electronic devices 102 and 104 may be a device which is the same as or different from the electronic device 101. According to an embodiment of the present disclosure, the server 106 may include a group of one or more servers. According to various embodiments of the present disclosure, all or some of the operations performed by the electronic device 101 may be performed by another electronic device or a plurality of electronic devices (for example, the electronic device 102 or 104 or the server 106). According to an embodiment of the present disclosure, when the electronic device 101 should perform some functions or services automatically or by request, the electronic device 101 may make a request for performing at least some of the functions related to the functions or services to another device (for example, the electronic device 102 or 104 or the server 106) instead of performing the functions or services by itself. The other electronic device (for example, the electronic device 102 or 104 or the server 106) may carry out the requested function or the additional function and transfer the result, obtained by carrying out the function, to the electronic device 101. The electronic device 101 may provide the requested functions or services based on the received result or after additionally processing the received result. To this end, for example, cloud computing, distributed computing, or client-server computing technology may be used.

According to an embodiment of the present disclosure, the screen configuration module 180 may support driving of the electronic device 101 by performing at least one of the operations (or functions) implemented by the electronic device 101. For example, the server 106 may include a screen configuration server module 108 capable of supporting the screen configuration module 180 implemented in the electronic device 101. For example, the screen configuration server module 108 includes one or more components of the screen configuration module 180 and may perform (on behalf of the screen configuration module 180) at least one of operations of the screen configuration module 180.

The screen configuration module 180 may process at least some of the information obtained from other components (for example, at least one of the processor 120, the memory 130, the input/output interface 150, and the communication module 170) and utilize the same in various manners. For example, the screen configuration module 180 may control at least some functions of the electronic device 101 by using the processor 120 or independently therefrom so that the electronic device 101 may interwork with other electronic devices (for example, the electronic device 104 or the server 106). The screen configuration module 180 may be integrated into the processor 120 or the communication module 170. According to an embodiment of the present disclosure, at least one component of the screen configuration module 180 may be included in the server 106 (for example, the screen configuration server module 108) and receive at least one operation, which is performed by the screen configuration module 180, from the server 106.

Figure 2:
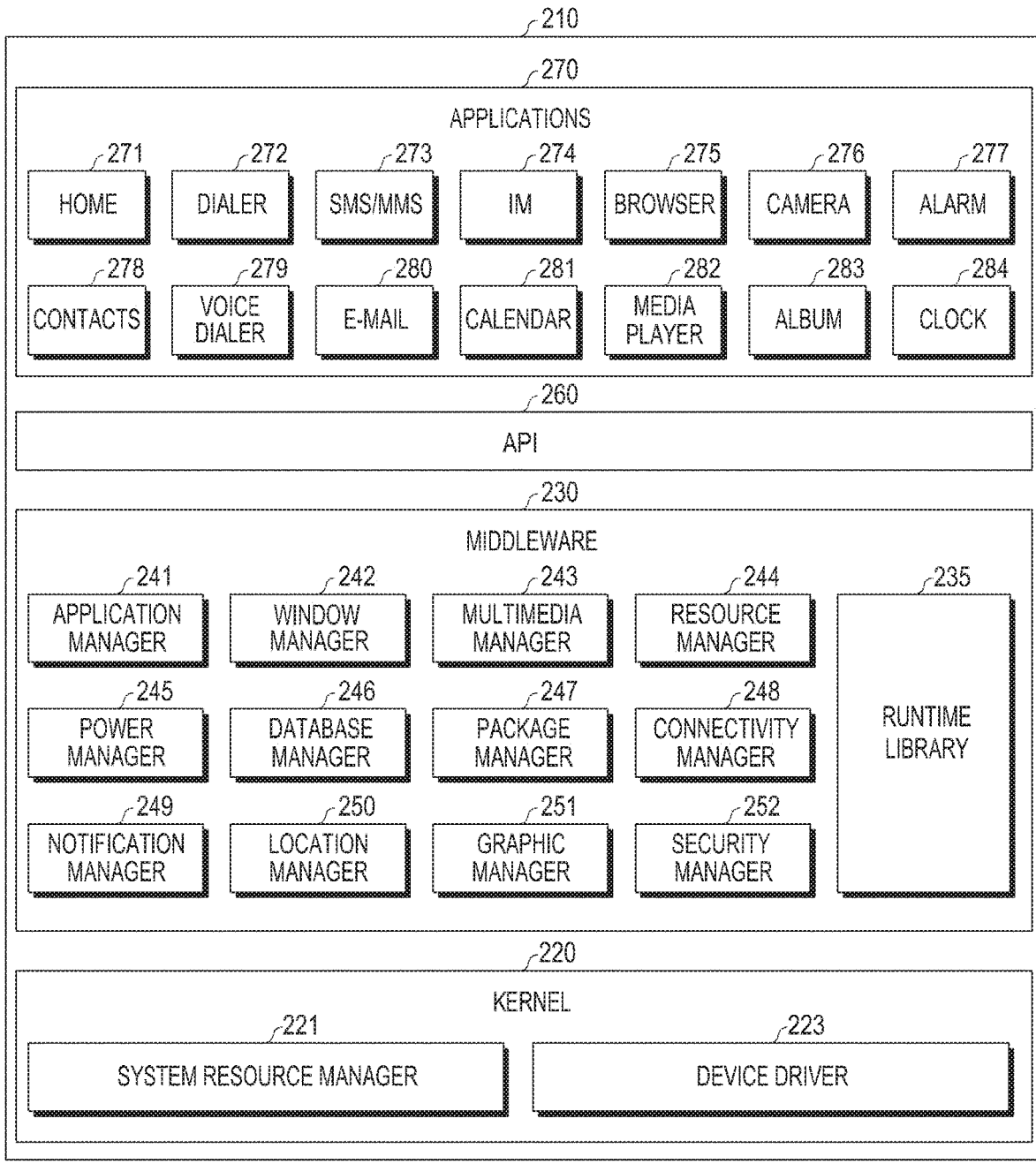
FIG. 2 is a block diagram of a program module according to various embodiments of the present disclosure.

FIG. 2 is a block diagram of a program module 210 according to various embodiments of the present disclosure.

Referring to FIG. 2, according to an embodiment of the present disclosure, the program module 210 (for example, the program 140) may include an OS for controlling resources related to the electronic device (for example, the electronic device 101) and/or various applications (for example, the application program 147) executed in the operating system. The operating system may be, for example, Android, iOS, Windows, Symbian, Tizen, Bada, or the like.

The program module 210 may include a kernel 310, middleware 230, an API 260, and/or an applications 270. At least some of the program module 210 may be preloaded in the electronic device or downloaded in the server (for example, the server 106).

The kernel 220 (for example, the kernel 141 of FIG. 1) may include, for example, a system resource manager 221 or a device driver 223. The system resource manager 221 may control, allocate, or collect the system resources. According to an embodiment of the present disclosure, the system resource manager 221 may include a process manager, a memory manager, or a file system manager. The device driver 223 may include, for example, a display driver, a camera driver, a Bluetooth (BT) driver, a shared-memory driver, a USB driver, a keypad driver, a Wi-Fi driver, an audio driver, or an inter-process communication (IPC) driver.

The middleware 230 may provide a function required by the applications 370 in common or provide various functions to the applications 270 through the API 260 so that the applications 270 can efficiently use limited system resources of the electronic device. According to an embodiment of the present disclosure, the middleware 230 (for example, the middleware 143) may include, for example, at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and a security manager 252.

The runtime library 235 may include, for example, a library module that a compiler uses in order to add new functions through a programming language while the applications 270 is executed. The runtime library 235 may perform input/output management, memory management, or a function for an arithmetic function.

The application manager 241 may manage, for example, a life cycle of at least one application among the applications 270. The window manager 242 may manage a graphical user interface (GUI) resource used in the screen. The multimedia manager 243 may detect a format required for reproducing various media files and encode or decode a media file using a codec appropriate for the corresponding format. The resource manager 244 may manage resources such as a source code, a memory or a storage space of at least one application among the applications 270.

The power manager 245 may operate together with a basic input/output system (BIOS) to manage a battery or power and may provide power information required for the operation of the electronic device. The database manager 246 may generate, search for, or change a database to be used by at least one of the applications 270. The package manager 247 may manage the installation or the updating of applications distributed in the form of package file.

For example, the connectivity manager 248 may manage wireless connections, such as Wi-Fi or BT. The notification manager 249 may display or notify an event such as a received message, an appointment, and a proximity notification to a user without disturbance. The location manager 250 may manage location information of the electronic device. The graphic manager 251 may manage graphic effects to be provided to a user and user interfaces related to the graphic effects. The security manager 252 may provide various security functions required for system security or user authentication. According to an embodiment of the present disclosure, when the electronic device (for example, electronic device 101) has a call function, the middleware 230 may further include a telephony manager for managing a voice call function or a video call function of the electronic device.

The middleware 230 may a middleware module for forming a combination of various functions of the aforementioned elements. The middleware 230 may provide modules specialized according to types of operating systems in order to provide differentiated functions. In addition, a few exiting component elements may be dynamically removed from the middleware 230, or new component elements may be added to the middleware 230.

The API 260 (for example, the API 145), which is a set of API programming functions, may include different configurations according to operating systems. For example, with respect to each platform, one API set may be provided in a case of Android or iOS, and two or more API sets may be provided in a case of Tizen.

The applications 270 (for example, the application program 147) may include, for example, one or more applications which can provide functions such as home 271, dialer 272, short message service (SMS)/multimedia message service (MMS) 273, instant message (IM) 274, browser 275, camera 276, alarm 277, contacts 278, voice dialer 279, email 280, calendar 281, media player 282, album 283, clock 284, health care (for example, measure exercise quantity or blood sugar), or environment information (for example, atmospheric pressure, humidity, or temperature information).

According to an embodiment of the present disclosure, the applications 270 may include an application (hereinafter, referred to as an "information exchange application" for convenience of the description) supporting information exchange between the electronic device (for example, the electronic device 101) and an external electronic device (for example, the electronic device 102 or 104). The information exchange application may include, for example, a notification relay application for transmitting specific information to the external electronic device, or a device management application for managing the external electronic device.

For example, the notification relay application may include a function of transferring, to the external electronic device (for example, the electronic device 102 or 104), notification information generated from other applications of the electronic device 101 (for example, an SMS/MMS application, an e-mail application, a health management application, or an environmental information application). Further, the notification relay application may receive notification information from, for example, the external electronic device and provide the received notification information to the user. The device management application may manage (for example, install, delete, or update), for example, a function for at least a part of the external electronic device (for example, the electronic device 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment of the present disclosure, the applications 270 may include an application (for example, health management application) designated according to attributes (for example, attributes of the electronic device such as the type of electronic device which corresponds to a mobile medical device) of the external electronic device (for example, the electronic device 102 or 104). According to an embodiment of the present disclosure, the applications 270 may include an application received from the external electronic device (for example, the server 106, or the electronic device 102 or 104). According to an embodiment of the present disclosure, the applications 270 may include a preloaded application or a third party application which can be downloaded from the server. Names of the components of the program module 210 according to the above described embodiments may vary depending on the type of operating system.

According to various embodiments of the present disclosure, at least some of the program module 210 may be implemented in software, firmware, hardware, or a combination of two or more thereof. At least some of the program module 210 may be implemented (for example, executed) by, for example, the processor (for example, the processor 120). At least some of the program module 210 may include, for example, a module, program, routine, sets of instructions, or process for performing one or more functions.

Figure 3A:
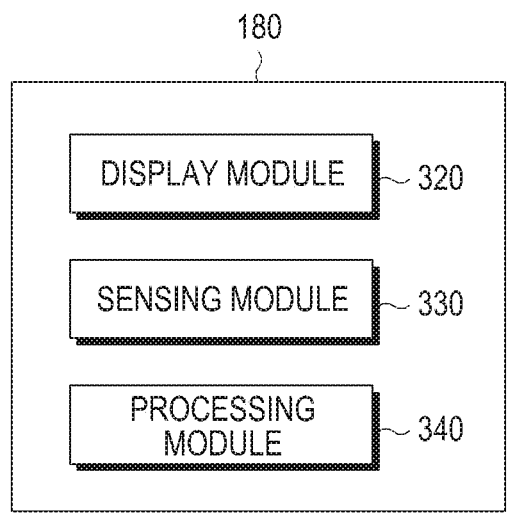
FIGS. 3A and 3B are block diagrams of a screen configuration module of an electronic device according to various embodiments of the present disclosure.
Figure 3B:
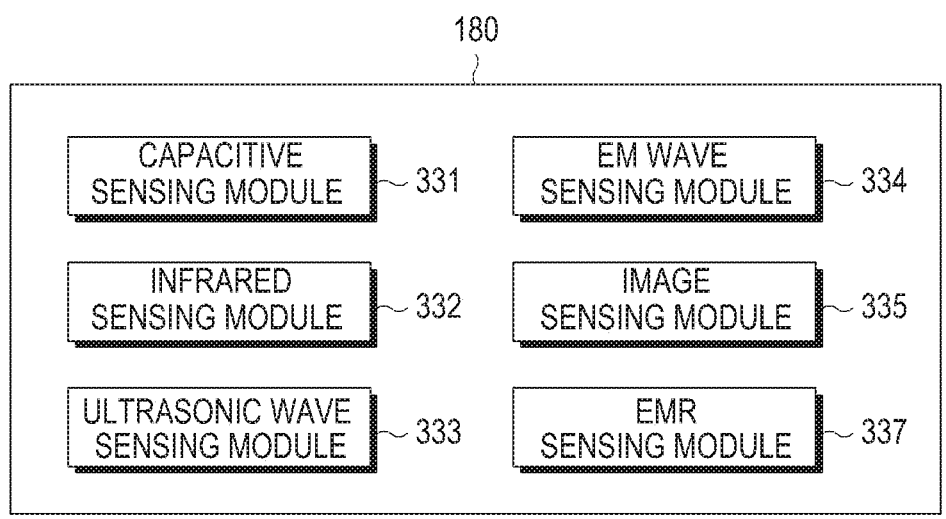

FIGS. 3A and 3B are block diagrams of the screen configuration module 180 of the electronic device (for example, the electronic device 101) according to various embodiments of the present disclosure.

Referring to FIGS. 3A and 3B, the screen configuration module 180 may include at least some or all of a display module 320, a sensing module 330, and a processing module 340. The screen configuration module 180 may be provided separately from the processor (for example, the processor 120) or all or some of the screen configuration module 180 may be integrated into the processor.

The sensing module 330 according to various embodiments of the present disclosure may acquire a distance between the electronic device and an input object for inputting an input into the electronic device.

The display module 320 according to various embodiments of the present disclosure may display at least one of an input screen and an output screen on the display of the electronic device based on the acquired distance.

The sensing module 330 according to various embodiments of the present disclosure may sense the distance between the electronic device and the object. The sensing module 330 may acquire the distance between the electronic device and the object based on a capacitive type, an infrared type, an ultrasonic wave type, or electromagnetic (EM) wave type, or an electromagnetic resonance (EMR) type.

The sensing module 330 may acquire an image including the object. For example, the acquired image may be acquired through a camera, which can obtain information on a distance between the object (i.e. input object such as a user's finger) and the camera such as a vision camera or a time-of-flight (TOF) camera.

Referring to FIG. 3B, the sensing module 330 may include a capacitive sensing module 331, an infrared sensing module 332, an ultrasonic wave sensing module 333, an EM wave sensing module 334, an image sensing module 335, and an EMR sensing module 337.

According to an embodiment of the present disclosure, the processing module 340 may determine the distance between the electronic device and the object based on the acquired image. When it is determined that the acquired distance is greater than or equal to a first threshold, the processing module 340 may control to display an output screen. When it is determined that the acquired distance is less than the first threshold, the processing module 340 may control to display an input screen. The processing module 340 may update the first threshold to a second threshold. When it is determined that the acquired distance is less than the second threshold, the processing module 340 may continue the displaying of the input screen. When it is determined that the acquired distance is greater than or equal to the second threshold, the processing module 340 may control the electronic device or the display of the electronic device to switch the input screen to the output screen and display the output screen. When the displaying of the switching to the output screen is made, the processing module 340 may update the second threshold to the first threshold.

According to an embodiment of the present disclosure, the processing module 340 may control at least one of a size, a form, a position, and an attribute of the input screen.

According to an embodiment of the present disclosure, the processing module 340 may control to display the output screen when it is determined that the acquired distance is equal to or less than the first threshold, and may control to display the input screen when it is determined that the acquired distance is greater than the first threshold.

By virtue of updating the threshold(s), the likelihood the display may repeatedly switch between displaying an input screen and an output screen when the distance between the object and the electronic device is close to the original first threshold is reduced, thus providing a more stable, reliable and user friendly user interface. More precisely, in some examples, by updating the first threshold with a larger second threshold when an input screen is displayed, the distance between the object and the electronic device required to cause a switch back to displaying the output screen is larger than the distance that was required to switch the display from displaying the output screen to the input screen.

According to an embodiment of the present disclosure, the processing module 340 may control to display the output screen when it is determined that the acquired distance is not included in a first range, and may control to display the input screen when it is determined that the acquired distance is included in the first range.

According to an embodiment of the present disclosure, the processing module 340 may configure a first condition and a second condition for a screen configuration of the electronic device. The processing module 340 may control to display the input screen on an entire surface or substantially the entire surface of the display of the electronic device when the first condition is met, and may control to display the output screen on an entire surface of the display of the electronic device when the second condition is met.

Figure 4:
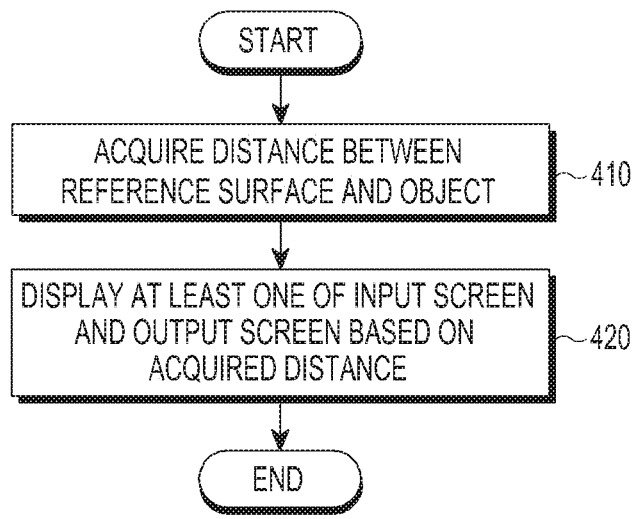
FIG. 4 is a flowchart illustrating a screen configuration method according to various embodiments of the present disclosure.

FIG. 4 is a flowchart illustrating a screen configuration method according to various embodiments of the present disclosure.

Referring to FIG. 4, in operation 410, the electronic device 101 may acquire a distance between a reference surface and an object. The reference surface may include at least one side of the electronic device. Alternatively, the reference surface may include a reference surface outside the electronic device 101. The object may be a finger or an input device, which can select one position of the touch panel of the electronic device 101. For example, the object may be a finger, and may select one position of the touch panel when the touch panel is implemented in a capacitive type, an infrared type, an ultrasonic wave type, or an EM wave type. Alternatively, the object may be an electronic pen, and may select one position of the touch panel when the touch panel is implemented in an ultrasonic wave type, an EM wave type, or an EMR type.

The electronic device 101 may include sensor modules such as an ultrasonic wave sensor, an infrared sensor, an EM wave sensor, an EMR sensor, and the like. The electronic device 101 may acquire a distance between the electronic device 101 and an object based on a value output from the sensor module.

According to an embodiment of the present disclosure, the electronic device 101 may include a vision camera module. The electronic device 101 may acquire an image including an object by using the vision camera module. The electronic device 101 may acquire a distance between the electronic device 101 and an object based on a result of analysis of the acquired image. Meanwhile, it may be easily understood by those skilled in the art that the camera type has no limitation if the camera corresponds a depth camera (a TOF camera or a stereo camera), which can acquire depth information of a subject for photography as well as the vision camera.

In operation 420, the electronic device 101 may display at least one of the input screen and the output screen based on the acquired distance. The input screen may be a screen including at least one object for input such as a keyboard. The input screen may include only the object for input or may further include an additional object related to the object for input in addition to the object for input. The output screen may be a screen corresponding to an output of a particular application and may be distinguished from the input screen but may have one or more features in common with the input screen.

According to an embodiment of the present disclosure, the electronic device 101 may display the input screen on an entire area of the display based on the acquired distance. According to an embodiment of the present disclosure, the electronic device 101 may display the output screen on an entire area of the display based on the acquired distance. According to an embodiment of the present disclosure, the electronic device 101 may display a screen having both the input screen and the output screen on the display based on the acquired distance.

Figure 5:
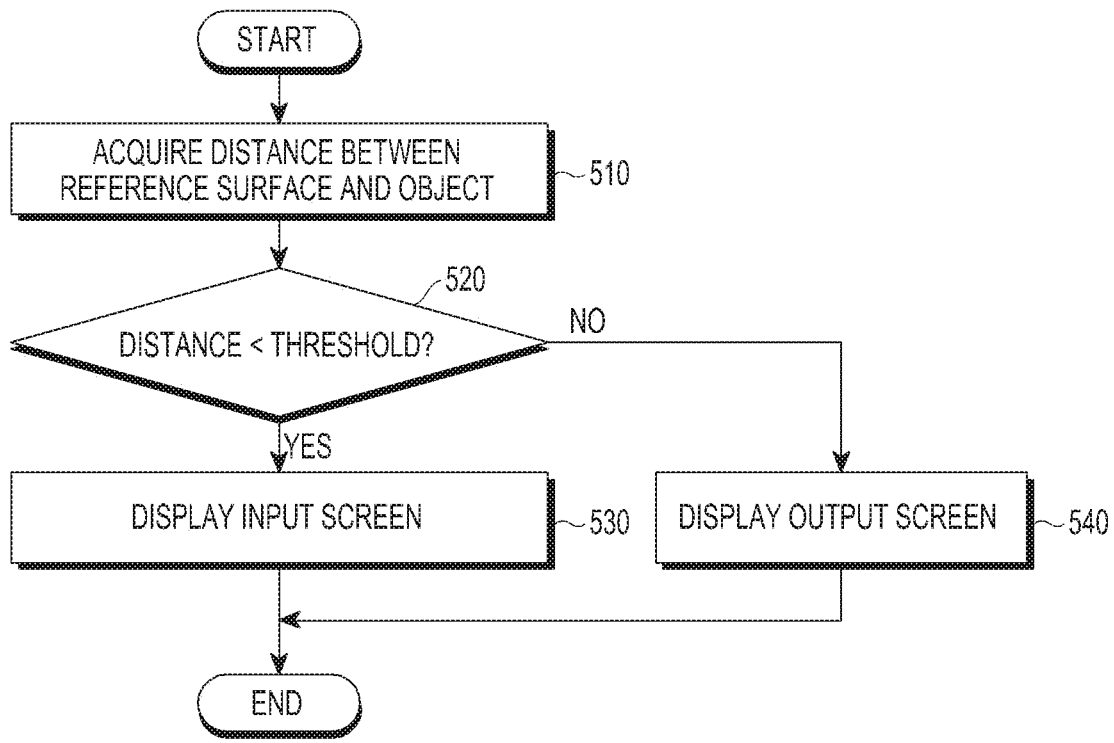
FIG. 5 is a flowchart illustrating a screen configuration method according to various embodiments of the present disclosure.
Figure 6A:
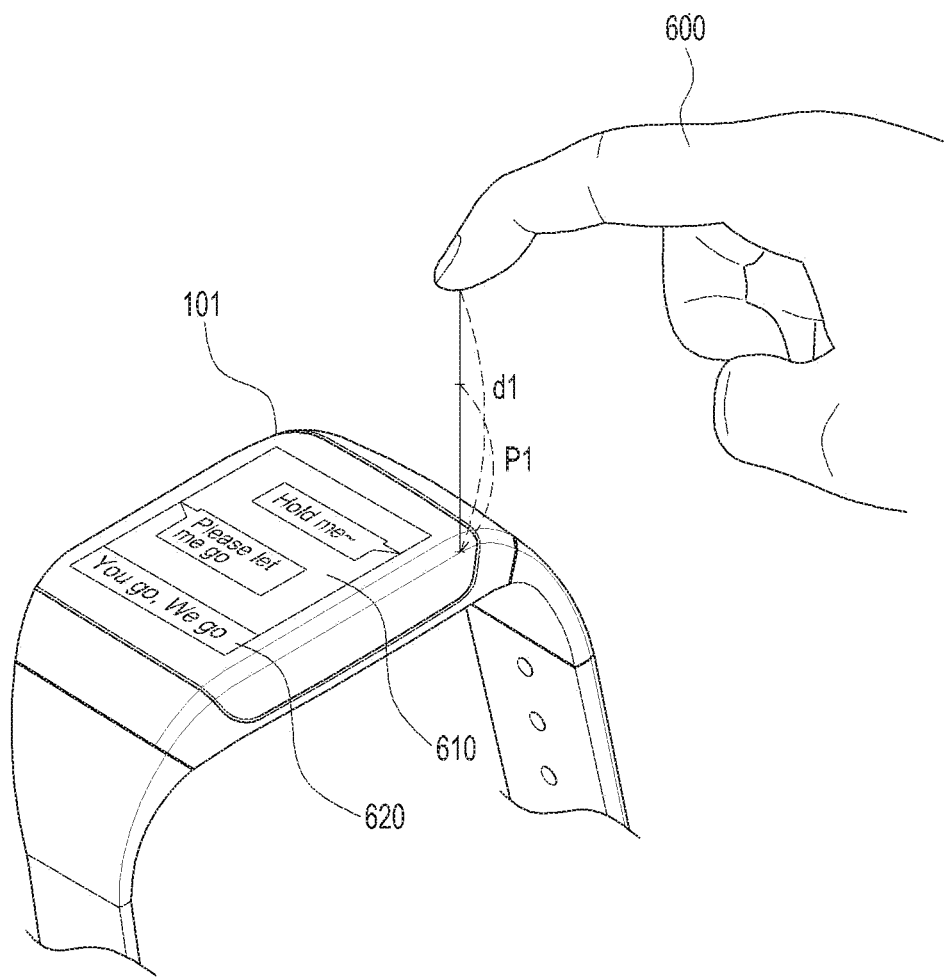
FIGS. 6A and 6B illustrate a concept of an electronic device according to various embodiments of the present disclosure.
Figure 6B:
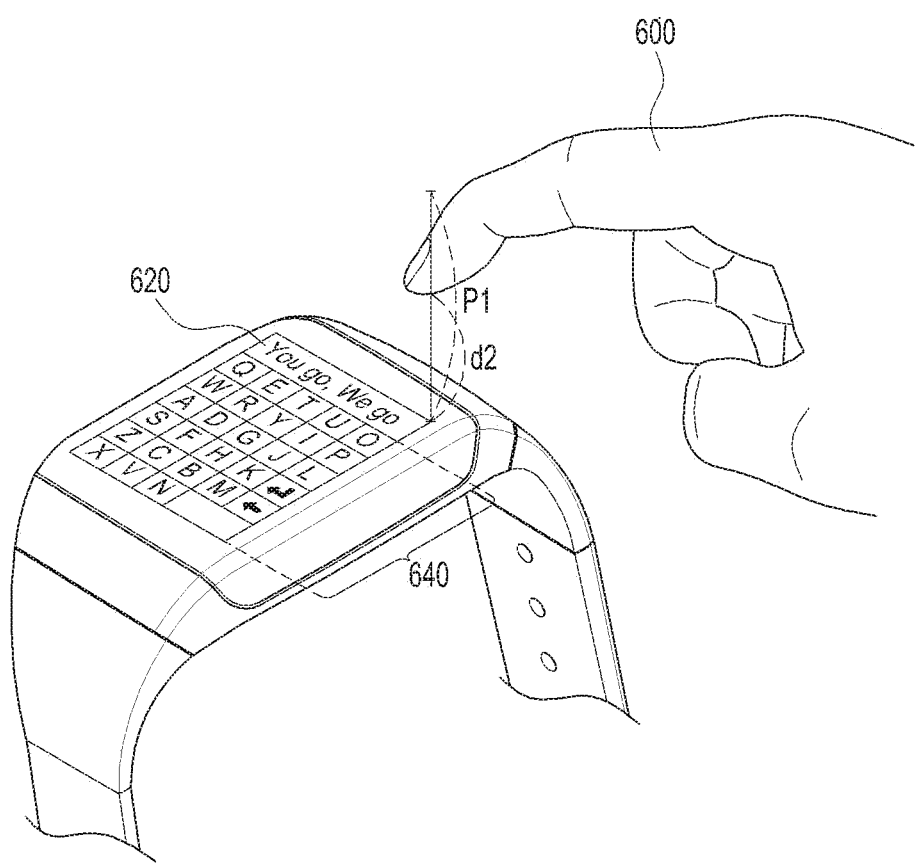

FIG. 5 is a flowchart illustrating a screen configuration method according to various embodiments of the present disclosure. The screen configuration method of FIG. 5 will be described in more detail with reference to FIGS. 6A and 6B. FIGS. 6A and 6B illustrate a concept of the electronic device according to various embodiments of the present disclosure.

Referring to FIG. 5, in operation 510, the electronic device 101 may acquire a distance between a reference surface and an object. As described above, the electronic device 101 may acquire the distance based on the value output from the sensor module or acquire the distance based on the result of the analysis of the image acquired by the vision camera. Meanwhile, it may be easily understood by those skilled in the art that a method of acquiring the distance between the reference surface and the object by the electronic device 101 has no limitation.

In operation 520, the electronic device 101 may determine whether the acquired distance is less than a threshold. The threshold may be preset to the electronic device 101. The threshold may vary depending on each electronic device 101, and may be pre-configured, for example, based on the size of the display of the electronic device 101. Alternatively, the threshold may be pre-configured based on a result of analysis of use habits of the electronic device 101 by the user. The threshold may be controlled by the user. Further, the threshold may be updated to another threshold (for example, the second threshold), which will be described below in more detail.

Referring to FIGS. 6A and 6B, the reference surface may be a surface including the display of the electronic device 101. Although not illustrated, the electronic device 101 may include sensor modules such as an ultrasonic wave sensor, an infrared sensor, an EM wave sensor, an EMR sensor, and the like, and may acquire a distance between an object 600 and the surface including the display of the electronic device 101 based on a value output from the sensor module. Alternatively, although not illustrated, the electronic device 101 may include a vision camera module, and acquire an image of the object 600 to acquire a distance d1 between the object 600 and the surface including the display of the electronic device 101. Meanwhile, a first threshold P1 may be pre-configured to the electronic device 101.

Referring to FIG. 5, when it is determined that the acquired distance is less than the first threshold, the electronic device 101 may display the input screen in operation 530. When it is determined that the acquired distance is greater than or equal to the first threshold, the electronic device 101 may display the output screen in operation 540.

Referring to FIG. 6A, the distance d1 between the electronic device 101 and the object 600 may be greater than or equal to the first threshold P1. The electronic device 101 may determine that the distance d1 between the electronic device 101 and the object 600 is greater than or equal to the first threshold P1 and display an output screen 610. According to the embodiment of FIG. 6A, the output screen 610 may be a screen corresponding to an output of a chatting application and may include a chatting history input by two users as illustrated in FIG. 6A. Meanwhile, the electronic device 101 may display an additional object such as a text input window 620. The output screen 610 may include the additional object such as the text input window 620.

Referring to FIG. 6B, a distance d2 between the electronic device 101 and the object 600 may be less than the first threshold P1. The electronic device 101 may determine that the distance d2 between the electronic device 101 and the object 600 is smaller the first threshold P1 and display an input screen 640. According to the embodiment of FIG. 6B, the input screen 640 may include an object for input such as a keyboard as illustrated in FIG. 6B. Meanwhile, the electronic device 101 may display the additional object such as the text input window 620. The input screen 640 may include the additional object such as the text input window 620. The electronic device 101 may control to display or not display the additional object such as the text input window 620 on the output screen 610 or the input screen 640. For example, when it is determined that an "Enter" key is input into the input screen 640, the electronic device 101 may control to not display the text input window 620 while reflecting the content displayed on the text input window 620 in the output screen 610.

The embodiments of FIGS. 6A and 6B may be sequentially executed. For example, the object 600 may reach the distance d2 from the distance d1 toward the reference surface. In this case, the electronic device 101 may switch the output screen 610 to the input screen 640 and display the input screen 640. Alternatively, inversely, the object 600 may move away from the reference surface from the distance d2 to the distance d1. In this case, the electronic device 101 may switch the input screen 640 to the output screen 610 and display the output screen 610. Meanwhile, when the electronic device 101 switches the output screen 610 to the input screen 640 or switches the input screen 640 to the output screen 610, an additional display effect may be processed. For example, the electronic device 101 may process a display effect as if the input screen 640 slides from a bezel, and it may be easily understood by those skilled in the art that such a display effect has no limitation.

As described above, the electronic device 101 may display at least one of the input screen and the output screen based on the distance between the reference surface and the object. Accordingly, the user is not required to perform an additional control to display the input screen. Further, as the input screen is displayed on the entire area of the display, an input error of the small electronic device is dramatically reduced.

Meanwhile, the electronic device 101 may configure the screen based on a combination with another gesture. For example, when the user makes the object approach the electronic device 101 in a state where the user touches the bezel of the electronic device 101, the electronic device 101 may operate to continue the displaying of the output screen without the displaying of the input screen. Alternatively, the electronic device 101 may configure an automatic switching mode and a general mode. When the electronic device 101 is in the automatic switching mode, the electronic device 101 may switch and display the input screen based on the approach of the object as described above. When the electronic device 101 is in the general mode, the electronic device 101 may continue the displaying of the output screen even though the object approaches.

Figure 7A:
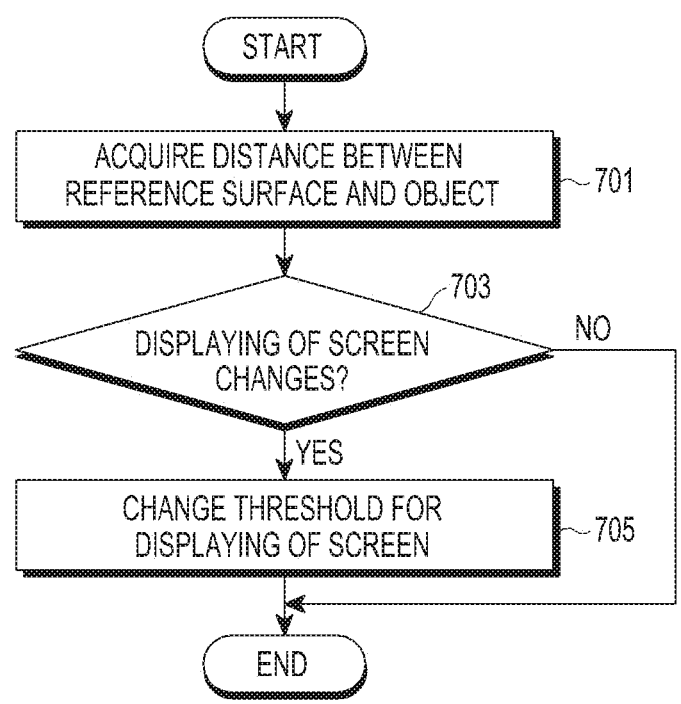
FIGS. 7A and 7B are flowcharts illustrating a screen configuration method according to various embodiments of the present disclosure.
Figure 7B:
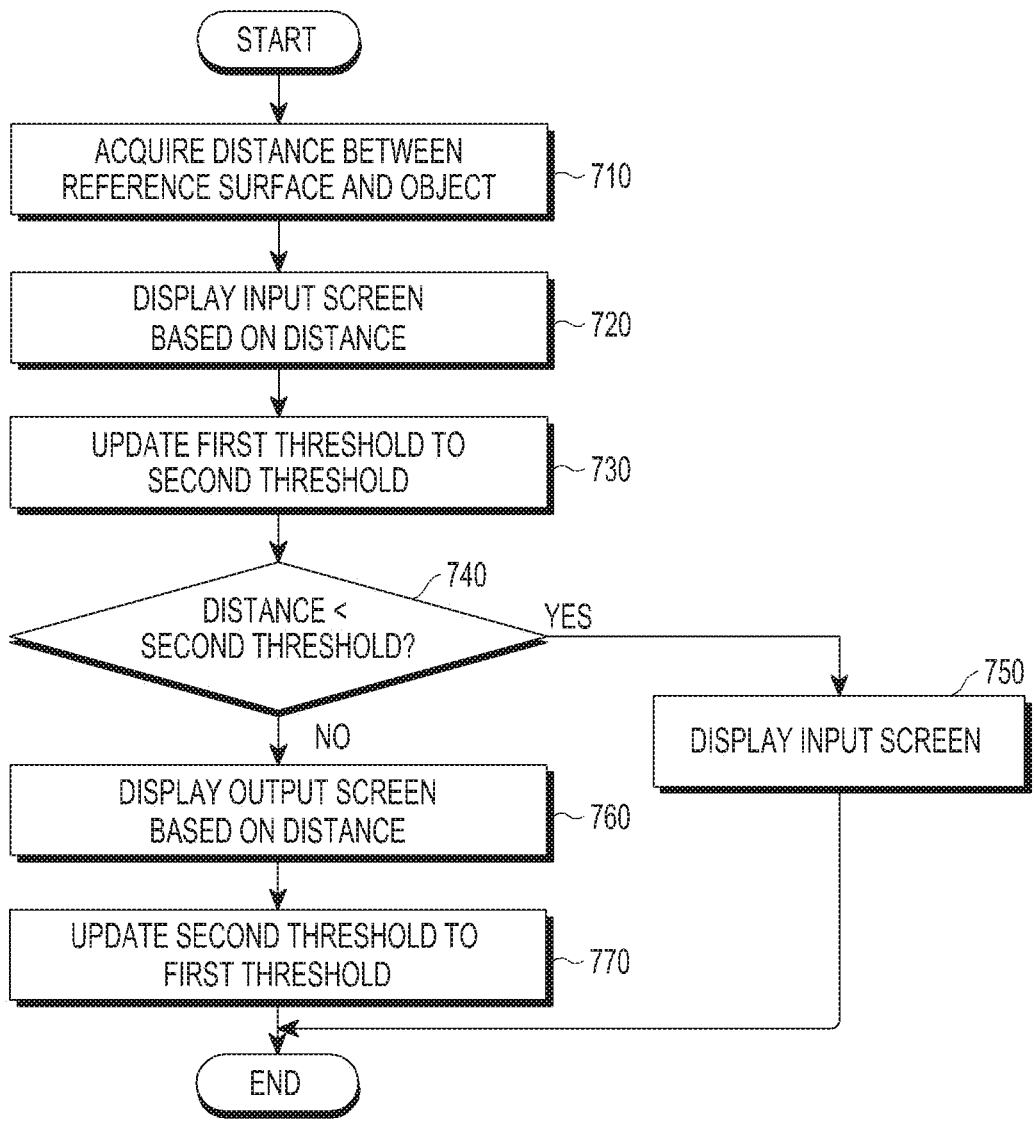

FIGS. 7A and 7B are flowcharts illustrating a screen configuration method according to various embodiments of the present disclosure.

Referring first to FIG. 7A, in operation 701, the electronic device 101 may acquire a distance between a reference surface and an object.

In operation 703, the electronic device 101 may determine whether the screen displaying changes. For example, the electronic device 101 may determine whether the input screen changes to the output screen or the output screen changes to the input screen.

When it is determined that the screen displaying changes, the electronic device 101 may update an existing preset threshold to another threshold in operation 705. This will be described in more detail with reference to FIG. 7B.

The screen configuration method of FIG. 7B will be described in more detail with reference to FIGS. 8A to 8E.

FIGS. 8A to 8E illustrate a concept of the electronic device according to various embodiments of the present disclosure.

Figure 8A:
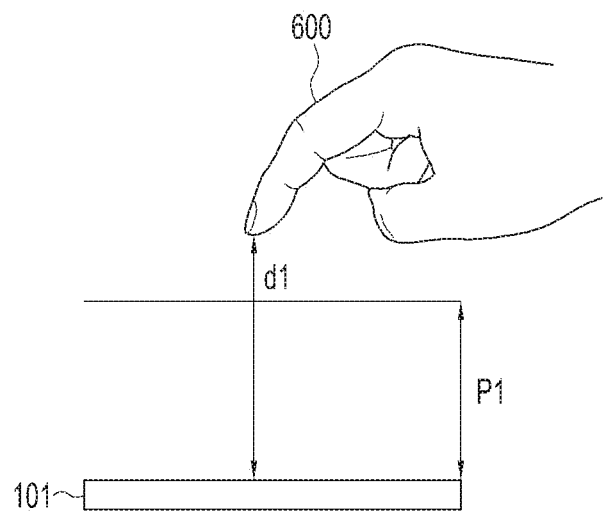
FIGS. 8A, 8B, 8C, 8D, and 8E illustrate a concept of an electronic device according to various embodiments of the present disclosure.
Figure 8B:
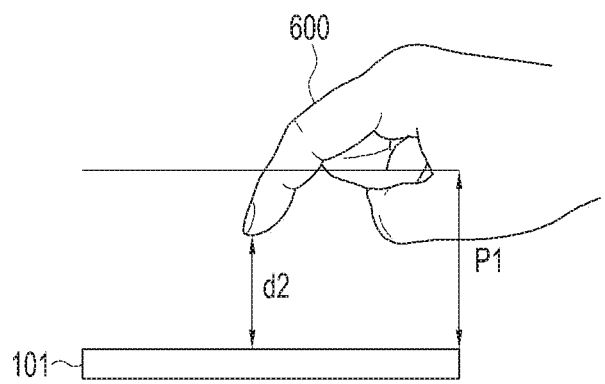

In operation 710, the electronic device 101 may acquire the distance d1 between the reference surface and the object 600 as illustrated in FIG. 8A.

Referring to FIGS. 8A to 8E, the reference surface may be a surface including the display of the electronic device 101.

In operation 720, the electronic device 101 may display the input screen based on the acquired distance d1. As described above, the electronic device 101 may compare the acquired distance with the first threshold P1, and display at least one of the input screen and the output screen based on a result of the comparison. According to the embodiment of FIG. 8A, the electronic device 101 may determine that the acquired distance d1 is greater than or equal to the first threshold P1 and display the output screen. According to the embodiment of FIG. 8B, the electronic device 101 may determine that the acquired distance d2 is less than the first threshold P1 and display the input screen.

In operation 730, the electronic device 101 may update the first threshold P1 to the second threshold P2.

Figure 8C:
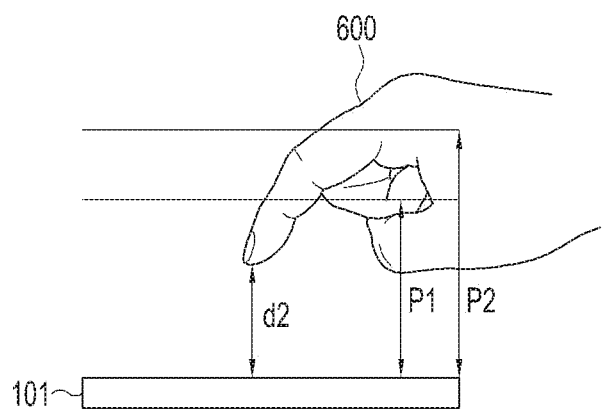

As illustrated in FIG. 8C, the second threshold P2 may be greater than the first threshold P1. For example, the electronic device 101 may trigger the displaying of the switching from the output screen to the input screen and update the first threshold P1 to the second threshold P2.

In operation 740, the electronic device 101 may determine whether the distance between the reference surface and the object 600 is less than the second threshold.

Figure 8D:
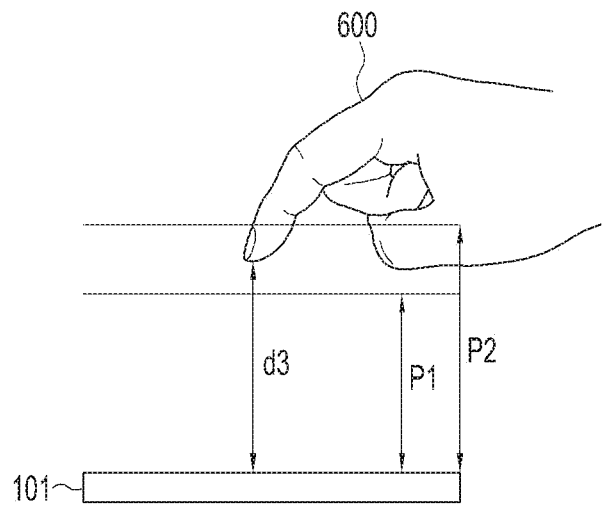

When the electronic device 101 determines that the distance between the reference surface and the object 600 is less than the second threshold P2, the electronic device 101 may display the input screen in operation 750. For example, as illustrated in FIG. 8D, the electronic device 101 may acquire a distance d3 between the reference surface and the object 600. The electronic device 101 may determine that the acquired distance d3 is less than the second threshold P2. Meanwhile, the distance d3 may be greater than or equal to the first threshold P1. The electronic device 101 may display the input screen based on the fact that the distance d3 is less than the second threshold P2.

Figure 8E:
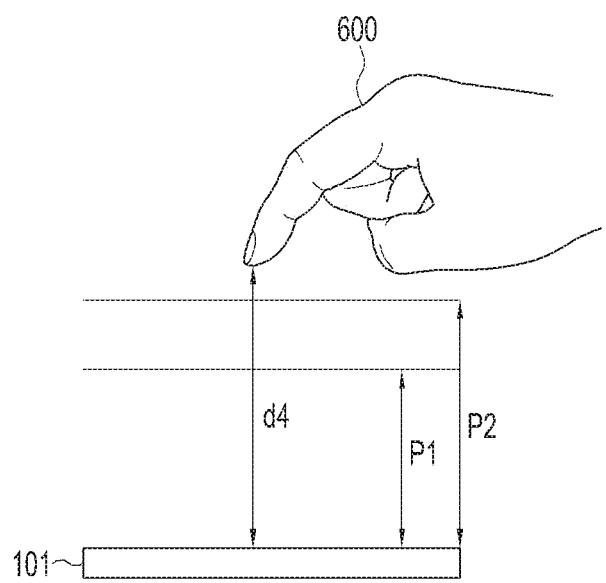

When the electronic device 101 determines that the distance between the reference surface and the object 600 is greater than or equal to the second threshold P2, the electronic device 101 may display the output screen in operation 760. For example, as illustrated in FIG. 8E, the electronic device 101 may acquire a distance d4 between the reference surface and the object 600. The electronic device 101 may determine that the acquired distance d4 is greater than or equal to the second threshold P2. The electronic device 101 may display the output screen based on the fact that the distance d4 is greater than or equal to the second threshold P2.

In operation 770, the electronic device 101 may update the second threshold P2 to the first threshold P1. As illustrated in FIG. 8C, the second threshold P2 may be greater than the first threshold P1. For example, the electronic device 101 may trigger the displaying of the switching from the input screen to the output screen and update the second threshold P2 to the first threshold P1.

Since the threshold is updated back to the first threshold P1, if the object 600 enters a position, for example, the distance d3, the electronic device 101 may display the output screen rather than the input screen.

As described above, the electronic device 101 may update the threshold by triggering the displaying of the switching from the input screen to the output screen and the displaying of the switching from the output screen to the input screen. Accordingly, after the output screen is switched to the input screen, even when the user places the object 600 on a somewhat high position (for example, higher than the first threshold), the displaying of the input screen may be maintained and thus ease of a control by the user may increase. Alternatively, as the threshold is configured to be low while the electronic device 101 displays the output screen, an input space of a user' gesture may be secured and the control ease may increase.

Figure 9A:
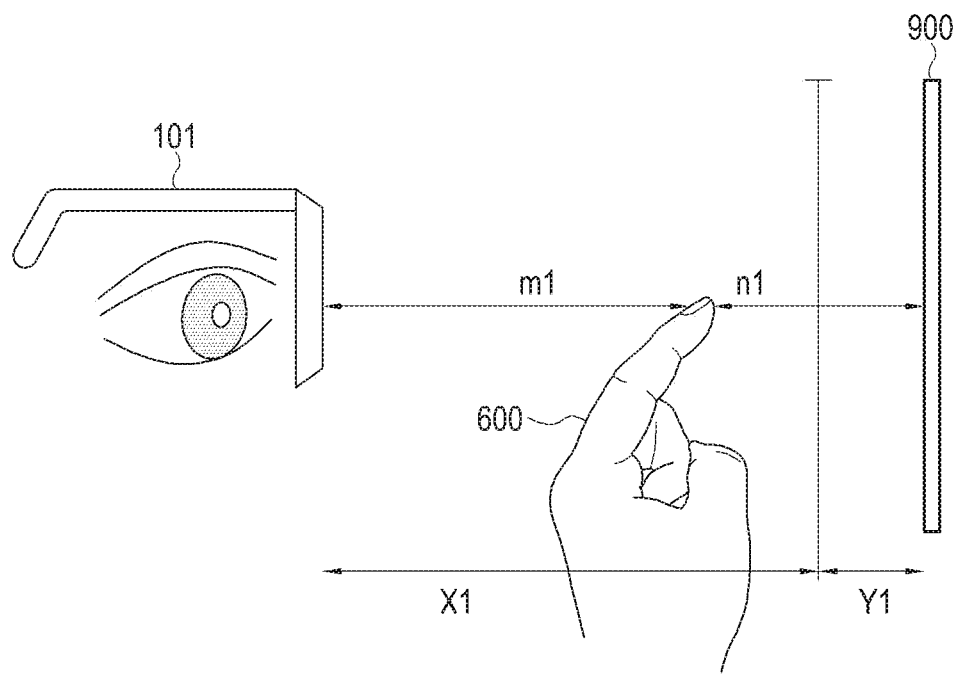
FIGS. 9A and 9B illustrate a concept of a glasses type wearable electronic device according to various embodiments of the present disclosure.
Figure 9B:
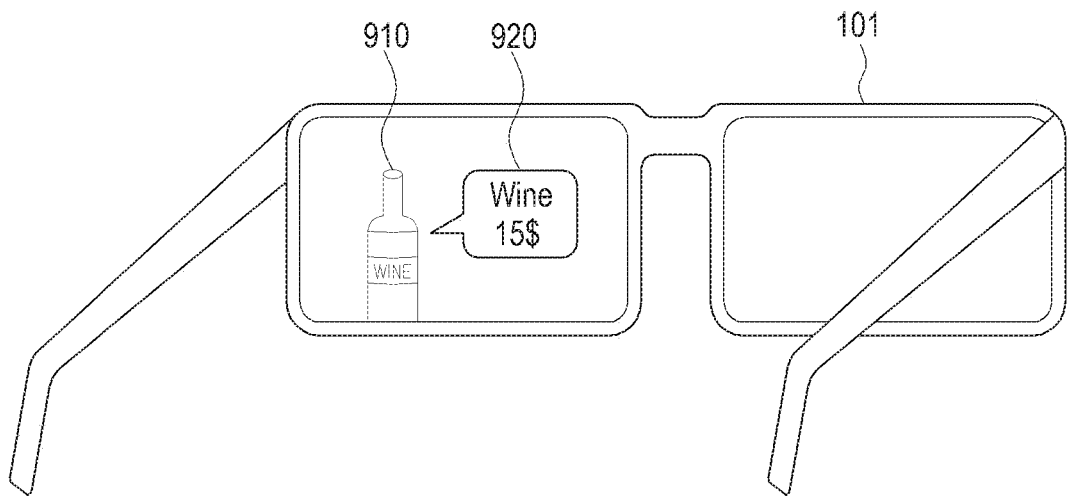

FIGS. 9A and 9B illustrate a concept of a glasses type wearable electronic device according to various embodiments of the present disclosure.

Referring to FIG. 9A, the electronic device 101 may acquire a distance n1 between a reference surface 900 and the object 600. Although not illustrated, the electronic device 101 may include sensor modules such as an ultrasonic wave sensor, an infrared sensor, an EM wave sensor, an EMR sensor, and the like. The electronic device 101 may acquire a distance m1 between the electronic device 101 and the object based on a value output from the sensor module. Further, the electronic device 101 may acquire a distance m1+n1 between the electronic device 101 and the reference surface 900 based on a value output from the sensor module. The electronic device 101 may acquire the distance n1 between the reference surface 900 and the object 600 based on the distance m1 between the electronic device 101 and the object and the distance m1+n1 between the electronic device 101 and the reference surface 900.

According to an embodiment of the present disclosure, the electronic device 101 may include a vision camera module. The electronic device 101 may acquire an image including the object 600 and the reference surface 900 by using the vision camera module. The electronic device 101 may acquire the distance m1 between the electronic device 101 and the object based on a result of analysis of the image. Further, the electronic device 101 may acquire the distance m1+n1 between the electronic device 101 and the reference surface 900 based on a result of analysis of the image. The electronic device 101 may acquire the distance n1 between the reference surface 900 and the object 600 based on the distance m1 between the electronic device 101 and the object and the distance m1+n1 between the electronic device 101 and the reference surface 900.

The electronic device 101 may configure a first threshold Y1 based on the acquired distance m1+n1 between the reference surface 900 and the electronic device 101. According to an embodiment of the present disclosure, the electronic device 101 may configure a first threshold X1 based on the distance m1+n1 between the reference surface 900 and the electronic device 101. That is, the electronic device 101 may configure, as the reference surface, at least one surface of the glasses of the electronic device 101 rather than the reference surface 900 of FIG. 9A.

The electronic device 101 may display the input screen based on the acquired distance n1. As described above, the electronic device 101 may compare the acquired distance with the first threshold Y1, and display at least one of the input screen and the output screen based on a result of the comparison. According to the embodiment of FIG. 9A, the electronic device 101 may determine that the acquired distance n1 is greater than or equal to the first threshold Y1 and display the output screen.

FIG. 9B illustrates a concept of the output screen according to various embodiments of the present disclosure.

Referring to FIG. 9B, the electronic device 101 may display an output screen 920. For example, the electronic device 101 may display the output screen 920 of an augmented reality (AR) application. The electronic device 101 may display additional information on an external object image 910 formed on the glasses on the output screen 920.

Meanwhile, it has been described that the electronic device 101 determines that the acquired distance n1 is greater than or equal to the first threshold Y1 and display the output screen in the embodiment of FIG. 9A. According to an embodiment of the present disclosure, the electronic device 101 may determine that the acquired distance m1 is less than the first threshold X1 and display the output screen. In this case, the electronic device 101 may be configured to display the output screen when the acquired distance m1 is equal to or less than the first threshold X1.

Figure 9C:
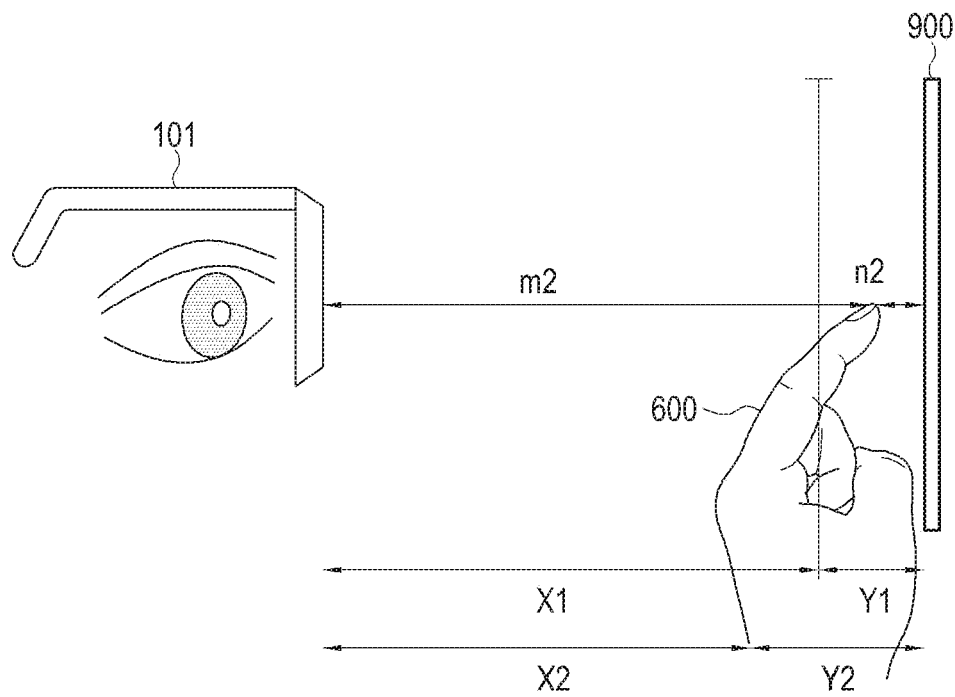
FIGS. 9C, 9D, and 9E illustrate a concept of an electronic device according to various embodiments of the present disclosure.

According to the embodiment of FIG. 9C, the electronic device 101 may acquire a distance m2 between the electronic device 101 and the object. Further, the electronic device 101 may acquire a distance m2+n2 between the electronic device 101 and the reference surface 900 based on a value output from the sensor module. The electronic device 101 may acquire a distance n2 between the reference surface 900 and the object 600 based on the distance m2 between the electronic device 101 and the object and the distance m2+n2 between the electronic device 101 and the reference surface 900.

The electronic device 101 may determine that the acquired distance n2 is less than the first threshold Y1 and display the input screen.

Figure 9D:
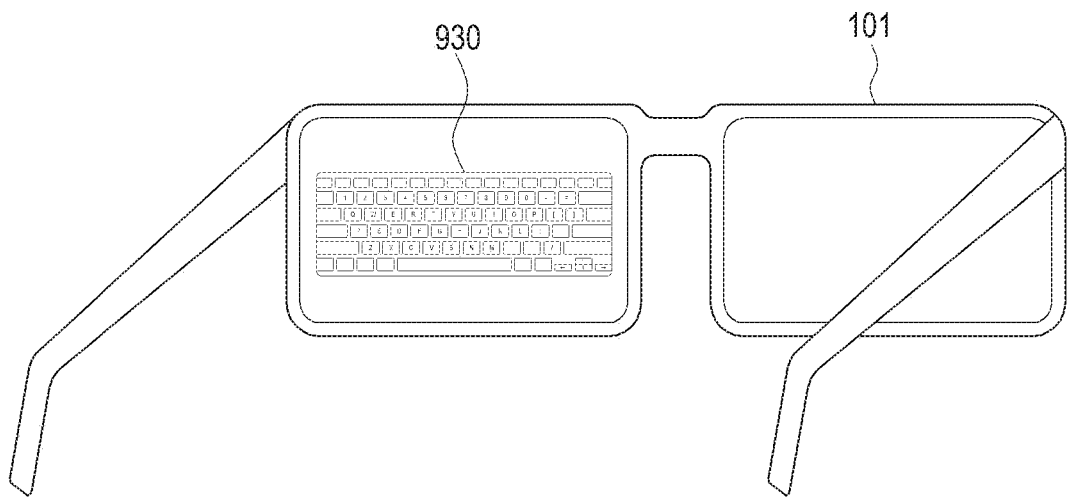

FIG. 9D illustrates a concept of the input screen according to various embodiments of the present disclosure.

Referring to FIG. 9D, the electronic device 101 may display an input screen 930. The electronic device 101 may display the input screen 930 including an object for input such as a keyboard.

Figure 9E:
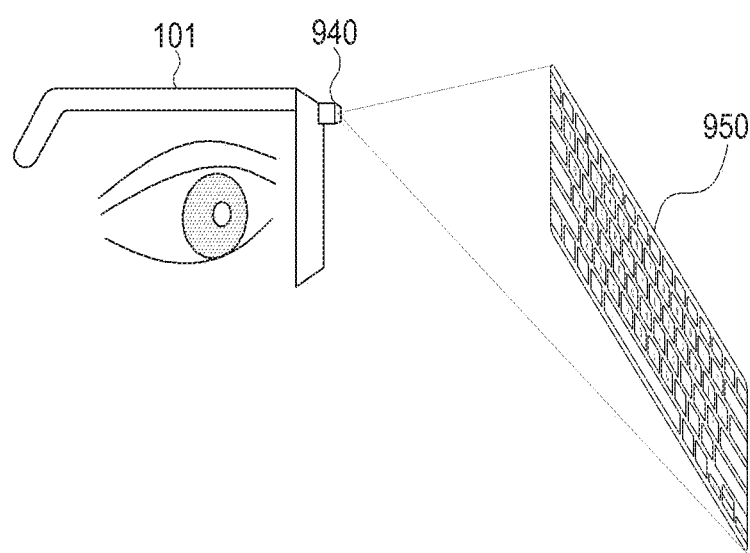

FIG. 9E illustrates a concept of the input screen according to various embodiments of the present disclosure.

Referring to FIG. 9E, the electronic device 101 may display an input screen 950. The electronic device 101 may display the input screen 950 including an object for input such as a keyboard. The electronic device 101 may include a projector 940. The projector 940 projects the input screen 950 onto a projection surface, and the user may observe the projected input screen 950. Meanwhile, although not illustrated, it may be easily understood by those skilled in the art that the projector 940 may display the output screen based on the acquired distance information.

Meanwhile, it has been described that the electronic device 101 determines that the acquired distance n2 is less than the first threshold Y1 and displays the input screen in the embodiment of FIG. 9C. According to an embodiment of the present disclosure, the electronic device 101 may determine that the acquired distance m2 is greater than the first threshold X1 and display the input screen. In this case, the electronic device 101 may be configured to display the input screen when the acquired distance m2 is greater than the first threshold X1.

According to various embodiments of the present disclosure, the electronic device 101 may update the first threshold Y1 to the second threshold Y2. As illustrated in FIG. 9B, the second threshold Y2 may be greater than the first threshold Y1. For example, the electronic device 101 may trigger the displaying of the switching from the output screen to the input screen and update the first threshold Y1 to the second threshold Y2. According to another embodiment, the electronic device 101 may update the first threshold X1 to the second threshold X2.

Further, the electronic device 101 may update the second threshold Y2 to the first threshold Y1. For example, the electronic device 101 may trigger the displaying of the switching from the input screen to the output screen and update the second threshold Y2 to the first threshold Y1. According to another embodiment, the electronic device 101 may update the second threshold X2 to the first threshold X1.

Figure 10A:
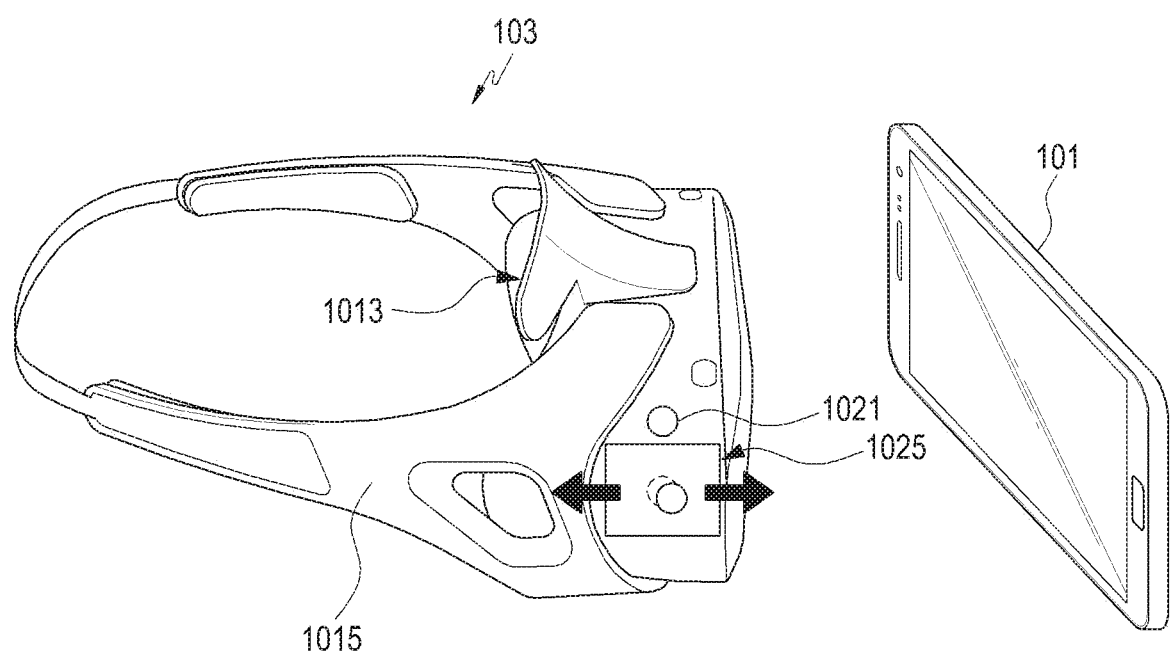
FIG. 10A is a perspective view of an electronic device and a head mounted theater (HMT) device according to an embodiment of the present disclosure.

FIG. 10A is a perspective view of the electronic device 101 and a head mounted theater (HMT) device 103 according to an embodiment of the present disclosure.

Referring to FIG. 10A, the electronic device 101 may include a display. The electronic device 101 may store a virtual reality application. The virtual reality application may be an application which can provide a display similar to an actual reality to the user. According to an embodiment of the present disclosure, the virtual reality application may display a left eye image and a right eye image corresponding to each of the user's eyes based on a stereo scheme.

The HMT device 103 may be mounted on a user' head to be fixed to the user's head even though the user moves. Further, the HMT device 103 may fix the electronic device 101 and thus the user may view an image displayed on the electronic device 101. The HMT device 103 may be electronic device 102.

The HMT device 103 according to an embodiment of the present disclosure may include a housing 1015 provided to be worn on the user's head, a blackout part 1013 fixed to the housing and provided at an area corresponding to locations of the user's eyes, and at least one input button 1021 provided at one area of the housing 1015. The electronic device 101 may include an input pad 1025 which may receive a swipe input from the user.

The user may make the blackout part 1013 fit closely to each of the user's eyes and, accordingly, the user may view the image by the virtual reality application provided from the electronic device 101 without any interference from external light.

The electronic device 101 may be coupled to the HMT device 103. The electronic device 101 may be connected to the electronic device 103 through a wire or wirelessly. For example, although the electronic device 101 may be connected to the HMT device 103 through a USB, it is only an example and it may be easily understood by those skilled in the art that there is no limitation on the connection if data transmission/reception between the electronic device 101 and the HMT device 103 is possible through the connection. According to an embodiment of the present disclosure, the electronic device 101 may be simply physically coupled to the HMT device 103.

Figure 10B:
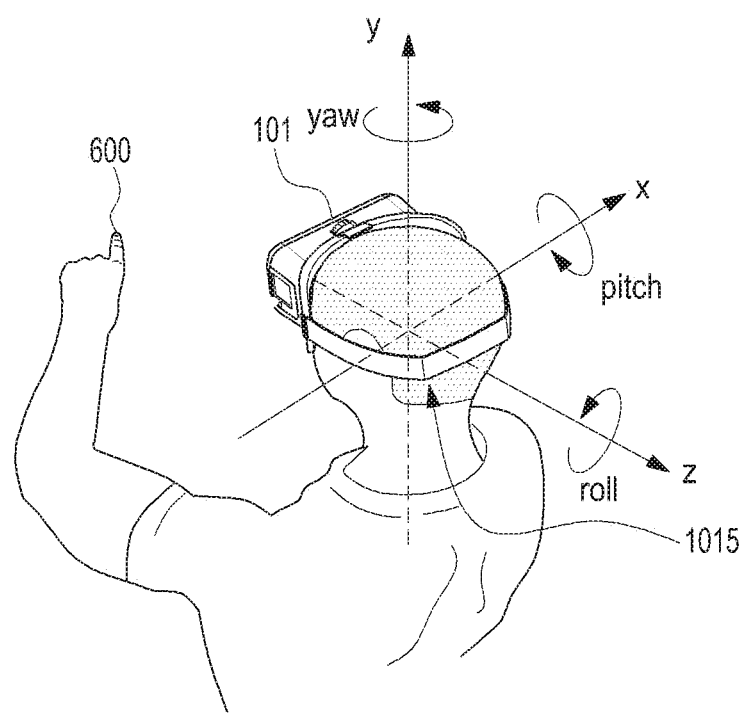
FIG. 10B is a perspective view illustrating a user wearing an HMT device.

FIG. 10B is a perspective view illustrating the user wearing the HMT device according to an embodiment of the present disclosure.

The user may wear the housing 1005 on the head. Further, the electronic device 101 may be coupled to the HMT device 103, and the user may view an image displayed on the display of the electronic device 101. The electronic device 101 may store and execute a virtual reality (VR) application.

The electronic device 101 may display a left eye image and a right eye image, which are results of the execution of the virtual reality application on left and right portions of the display. The left eye image may be incident on the user's left eye and the right eye image may be incident on the user's right eye. For example, the left eye image and the right eye image may be incident on the user's view through both eyes. The user may receive a virtual reality service by viewing the images incident on both eyes.

The virtual reality application executed by the electronic device 101 may display a binocular image on the display. The virtual reality application may change and display the binocular image according to a motion (yaw, pitch, or roll) of the user or the HMT device 103.

Meanwhile, the user may input a user command into the electronic device 101 by using the object 600 such as a finger. The electronic device 101 may sense or photograph the object 600. The electronic device 101 may receive a user command based on a motion of the object 600. Alternatively, the electronic device 101 may receive a user command based on a distance between the object 600 and the electronic device 101.

FIGS. 10C to 10H illustrate a concept of an electronic device according to various embodiments of the present disclosure.

Figure 10C:
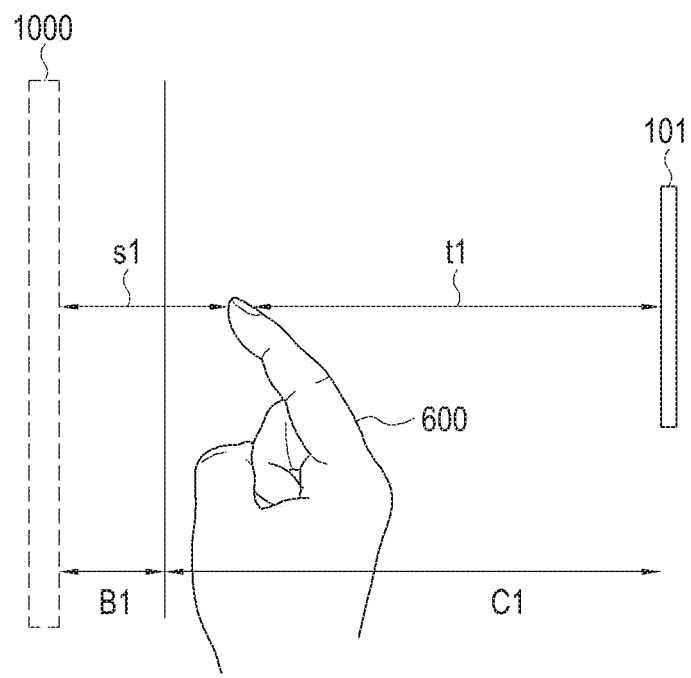
FIGS. 10C, 10D, 10E, 10F, 10G, and 10H illustrate a concept of an electronic device according to various embodiments of the present disclosure.

Referring to FIG. 10C, the electronic device 101 may acquire a distance s1 between a reference surface 1000 and the object 600. Although not illustrated, the electronic device 101 may include sensor modules such as an ultrasonic wave sensor, an infrared sensor, an EM wave sensor, an EMR sensor, and the like. The electronic device 101 may acquire a distance t1 between the electronic device 101 and the object based on a value output from the sensor module. Further, the electronic device 101 may configure the virtual reference surface 1000 at a position with a preset distance s1+t1 from the front of the electronic device 101. The electronic device 101 may acquire the distance s1 between the reference surface 1000 and the object 600 based on the distance t1 between the electronic device 101 and the object and the distance s1+t1 between the electronic device 101 and the reference surface 1000.

According to an embodiment of the present disclosure, the electronic device 101 may include a vision camera module. The electronic device 101 may acquire an image including the object 600 by using the vision camera module. The electronic device 101 may acquire the distance t1 between the electronic device 101 and the object based on a result of analysis of the image. Further, the electronic device 101 may acquire the distance s1 between the virtual reference surface 1000 and the object 600 based on a result of analysis of the image.

The electronic device 101 may configure a first threshold B1 based on the acquired distance s1+t1 between the reference surface 1000 and the electronic device 101. According to an embodiment of the present disclosure, the electronic device 101 may configure a first threshold C1 based on the distance s1+t1 between the reference surface 1000 and the electronic device 101. That is, the electronic device 101 may configure, as the reference surface, at least one surface of the electronic device 101 rather than the reference surface 1000 of FIG. 10C.

The electronic device 101 may display the input screen based on the acquired distance s1. As described above, the electronic device 101 may compare the acquired distance with the first threshold B1, and display at least one of the input screen and the output screen based on a result of the comparison. According to the embodiment of FIG. 10C, the electronic device 101 may determine that the acquired distance s1 is greater than or equal to the first threshold B1 and display the output screen.

Figure 10D:
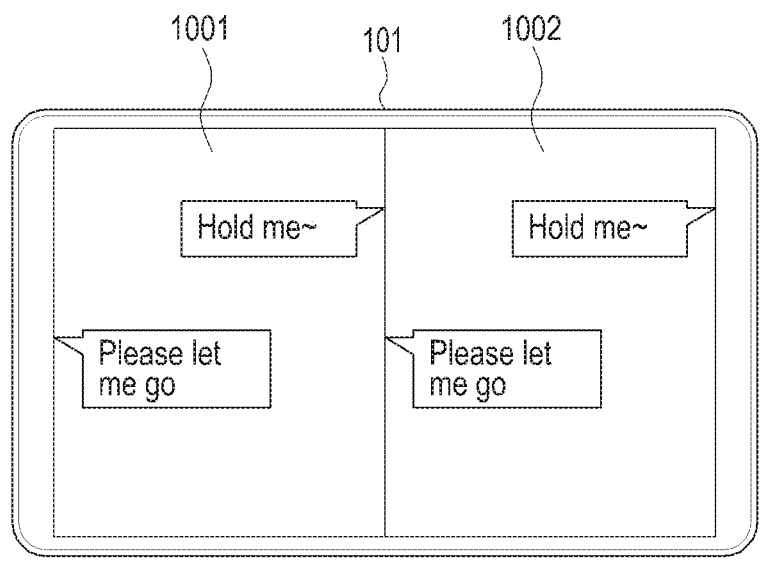

FIG. 10D illustrates a concept of the output screen according to various embodiments of the present disclosure.

Referring to FIG. 10D, the electronic device 101 may display output screens 1001 and 1002. For example, the electronic device 101 may display the output screens 1001 and 1002 of the virtual application. The output screens 1001 and 1002 may include a binocular image.

Meanwhile, it has been described that the electronic device 101 determines that the acquired distance s1 is greater than or equal to the first threshold B1 and displays the output screen in the embodiment of FIG. 10C. According to an embodiment of the present disclosure, the electronic device 101 may determine that the acquired distance t1 is equal to or less than the first threshold C1 and display the output screen. In this case, the electronic device 101 may be configured to display the output screen when the acquired distance t1 is equal to or less than the first threshold C1.

Figure 10E:
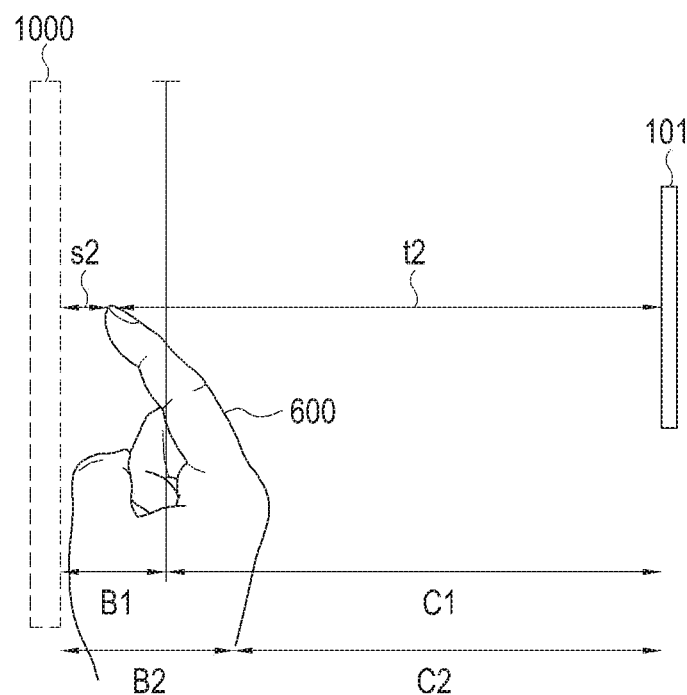

According to the embodiment of FIG. 10E, the electronic device 101 may acquire a distance t2 between the electronic device 101 and the object. Further, the electronic device 101 may acquire a distance s2 between the reference surface 1000 and the object 600.

The electronic device 101 may determine that the acquired distance s2 is less than the first threshold B1 and display the input screen.

Figure 10F:
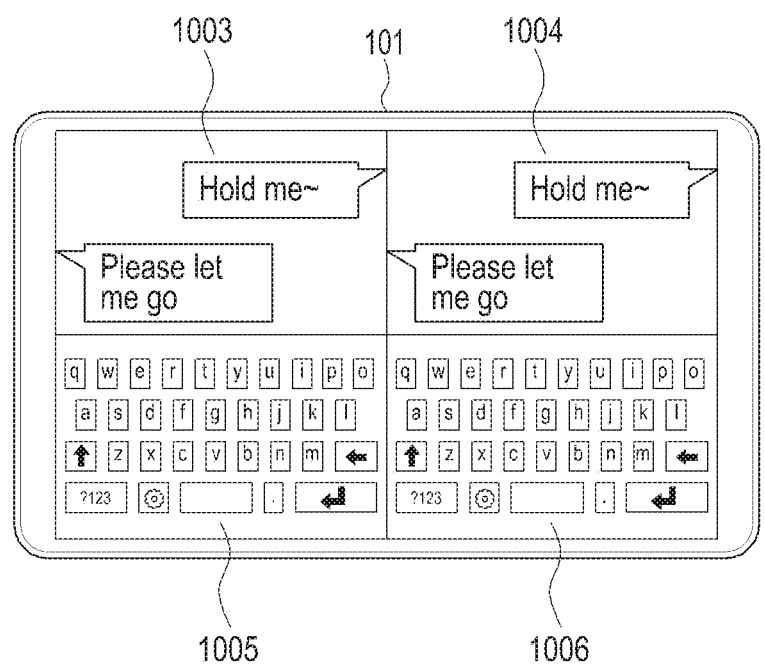

FIG. 10F illustrates a concept of the input screen according to various embodiments of the present disclosure.

Referring to FIG. 10F, the electronic device 101 may display input screens 1005 and 1006. The electronic device 101 may display the input screens 1005 and 1006 including an object for input such as a keyboard. The electronic device 101 may also display output screens 1003 and 1004.

Meanwhile, it has been described that the electronic device 101 determines that the acquired distance s2 is less than the first threshold B1 and displays the input screen in the embodiment of FIG. 10E. According to an embodiment of the present disclosure, the electronic device 101 may determine that the acquired distance t2 is greater than the first threshold C1 and display the input screen. In this case, the electronic device 101 may be configured to display the input screen when the acquired distance t2 is greater than or equal to the first threshold C1.

According to various embodiments of the present disclosure, the electronic device 101 may update the first threshold B1 to the second threshold B2. Referring to FIG. 10E, the second threshold B2 may be greater than the first threshold C1. For example, the electronic device 101 may trigger the displaying of the switching from the output screen to the input screen and update the first threshold B1 to the second threshold B2. According to an embodiment of the present disclosure, the electronic device 101 may update the first threshold C1 to the second threshold C2.

Further, the electronic device 101 may update the second threshold B2 to the first threshold B1 again. For example, the electronic device 101 may trigger the displaying of the switching from the input screen to the output screen and update the second threshold B2 to the first threshold B1. According to an embodiment of the present disclosure, the electronic device 101 may update the second threshold C2 to the first threshold C1.

Figure 10G:
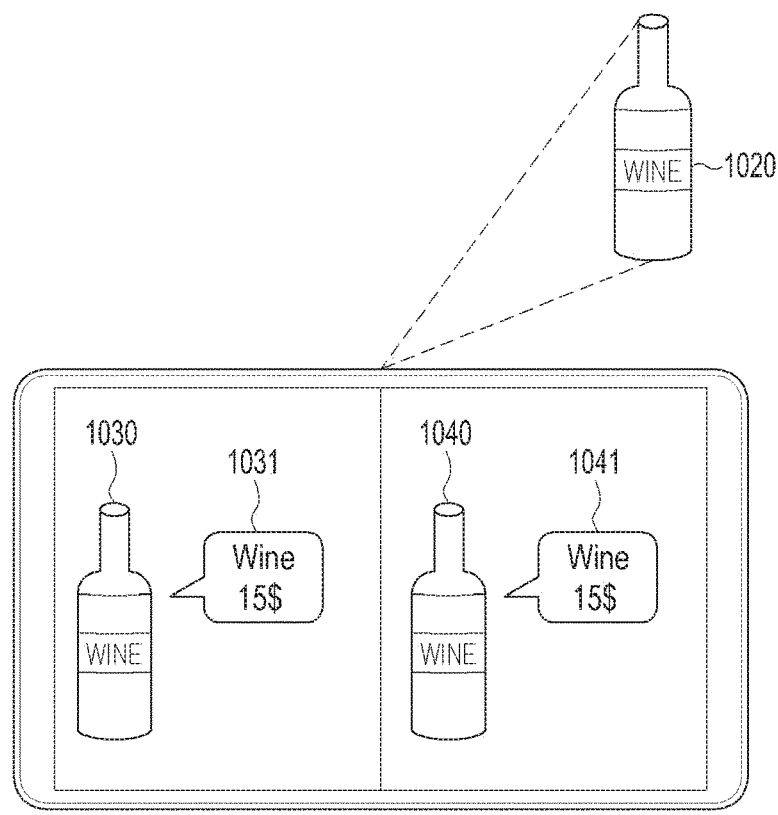
Figure 10H:
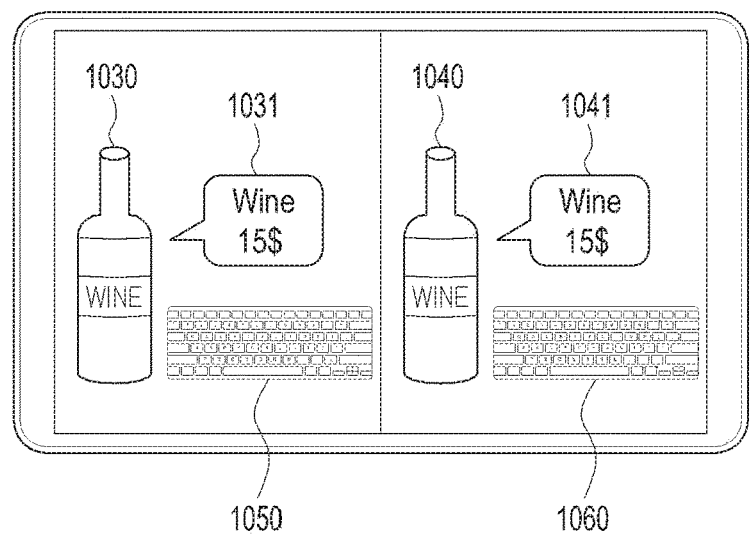

FIGS. 10G and 10H illustrate a concept of the electronic device according to various embodiments of the present disclosure.

Referring to FIG. 10G, the electronic device 101 may photograph a subject 1020 and display a left eye screen 1030 and a right eye screen 1040 in accordance with the photographed subject. Further, the electronic device 101 may display information 1031 or 1041 on the subject 1020 in accordance with the left eye screen 1030 and the right eye screen 1040.

Meanwhile, the electronic device 101 may determine that the acquired distance s2 is less than the first threshold B1 and display the input screen. The electronic device 101 may display a left eye input screen 1050 and a right eye input screen 1060 as illustrated in FIG. 10H. Referring to FIG. 10H, the electronic device 101 may display the left eye input screen 1050 and the right eye input screen 1060 together with the left eye screen 1030 and the right eye screen 1040, that is, the output screens.

Figure 11:
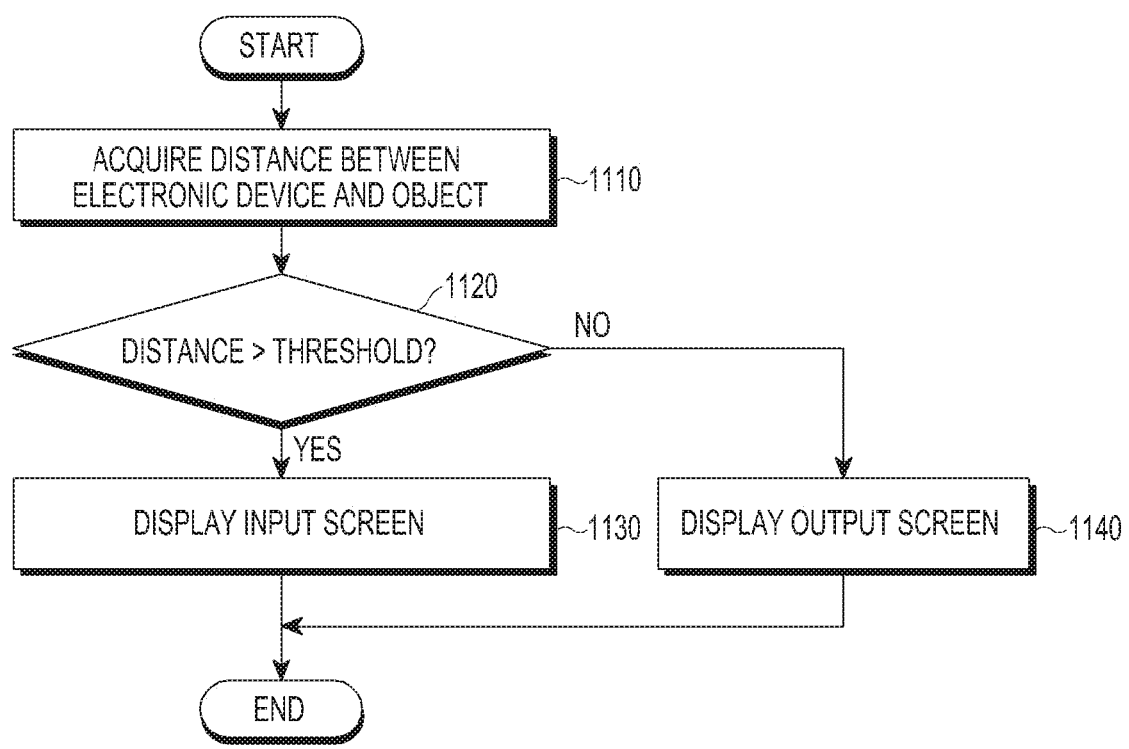
FIG. 11 is a flowchart illustrating a screen configuration method according to various embodiments of the present disclosure.

FIG. 11 is a flowchart illustrating a screen configuration method according to various embodiments of the present disclosure. The screen configuration method of FIG. 11 will be described in more detail with reference to, for example, the embodiments of FIGS. 9C and 10E.

Referring to FIG. 11, in operation 1110, the electronic device 101 may acquire a distance between the electronic device 101 and an object.

In operation 1120, the electronic device 101 may determine whether the acquired distance is greater than a threshold. The threshold may be expressed by X1 and C1 in FIGS. 9A and 10E, respectively, and may be a distance from the electronic device 101.

When it is determined that the acquired distance is greater than the threshold, the electronic device 101 may display the input screen in operation 1130. For example, when it is determined that the acquired distance is greater than the threshold X1, the electronic device 101 may display the input screen as illustrated in FIG. 9C.

When it is determined that the acquired distance is equal to or less than the threshold, the electronic device 101 may display the output screen in operation 1140. For example, when it is determined that the acquired distance is equal to or less than the threshold X1, the electronic device 101 may display the output screen as illustrated in FIG. 9C.

Figure 12:
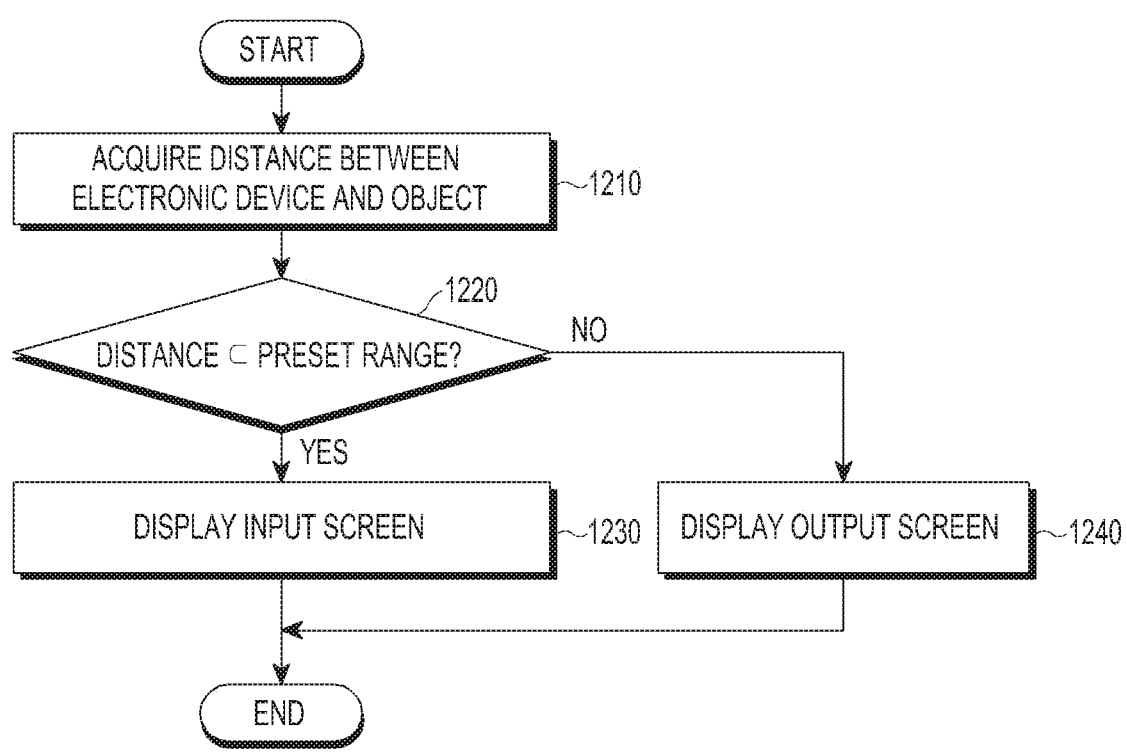
FIG. 12 is a flowchart illustrating a screen configuration method according to various embodiments of the present disclosure.

FIG. 12 is a flowchart illustrating a screen configuration method according to various embodiments of the present disclosure.

Referring to FIG. 12, in operation 1210, the electronic device 101 may acquire a distance between the electronic device 101 and an object.

In operation 1220, the electronic device 101 may determine whether the acquired distance is included in a preset range.

When it is determined that the acquired distance is included in the preset range, the electronic device 101 may display the input screen in operation 1230.

When it is determined that the acquired distance is not included in the preset range, the electronic device 101 may display the output screen in operation 1240.

As illustrated in FIG. 12, the electronic device 101 may display at least one of the input screen and the output screen based on whether the distance is included in the preset range rather than the comparison with a particular threshold.

Figure 13:
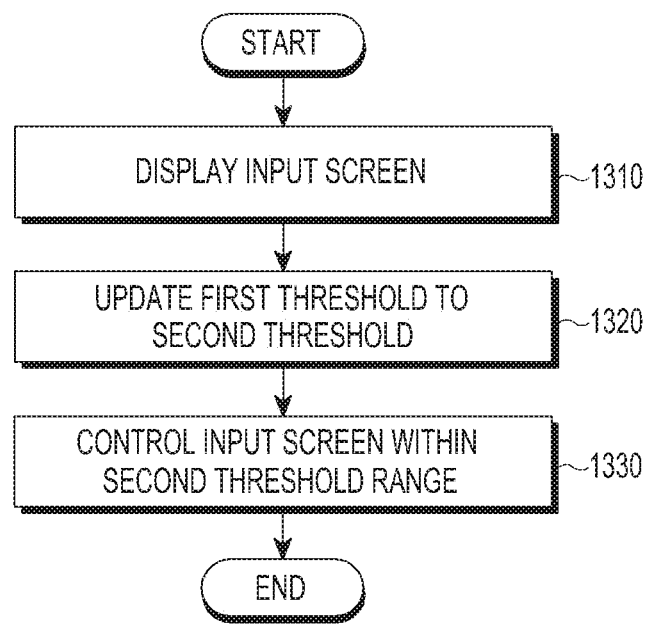
FIG. 13 is a flowchart illustrating a screen configuration method according to various embodiments of the present disclosure.

FIG. 13 is a flowchart illustrating a screen configuration method according to various embodiments of the present disclosure.

Referring to FIG. 13, in operation 1310, the electronic device 101 may display the input screen. For example, the electronic device 101 may display the output screen before displaying the input screen. The electronic device 101 may sense a proximity of the object to the electronic device 101. The electronic device 101 may acquire a distance between the object and the electronic device 101 and determine that the acquired distance is less than a first threshold. The electronic device 101 may display the input screen based on the fact that the acquired distance is less than the first threshold.

In operation 1320, the electronic device 101 may update the first threshold to a second threshold. As described above, the second threshold may be greater than the first threshold in an embodiment. Accordingly, when the distance between the electronic device 101 and the object is greater than the first threshold and less than the second threshold, the electronic device 101 may continue the displaying of the input screen. Accordingly, even though the user performs an input within a range of the second threshold, the input screen may not change to the output screen.

In operation 1330, the electronic device 101 may control the input screen within the range of the second threshold. The electronic device 101 may control the input screen based on an acquired control command. For example, the electronic device 101 may change at least one of a position, a size, and a form of the object for input. Alternatively, the electronic device 101 may change at least one of a position, a size, and a form of an input window. Alternatively, the electronic device 101 may change a position of an input cursor. Alternatively, the electronic device 101 may change an attribute of the object for input. The above described control of the input screen will be described below in more detail.

Figure 14:
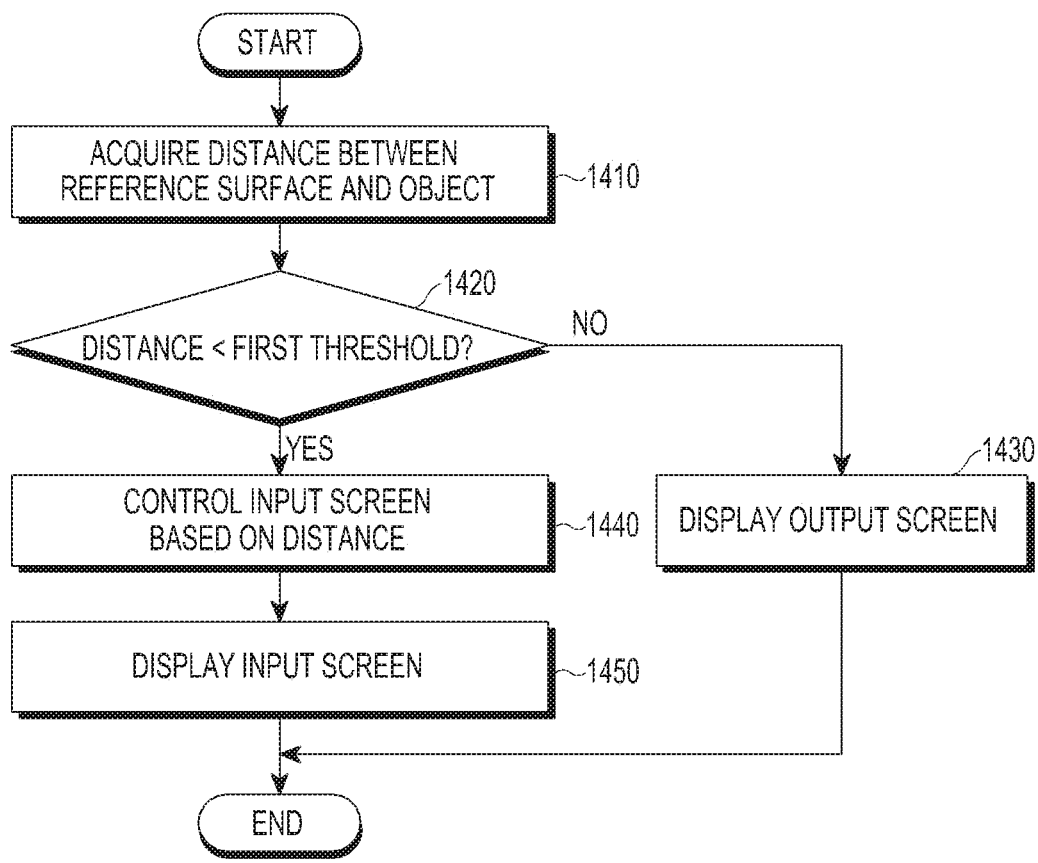
FIG. 14 is a flowchart illustrating a screen configuration method according to various embodiments of the present disclosure.
Figure 15:
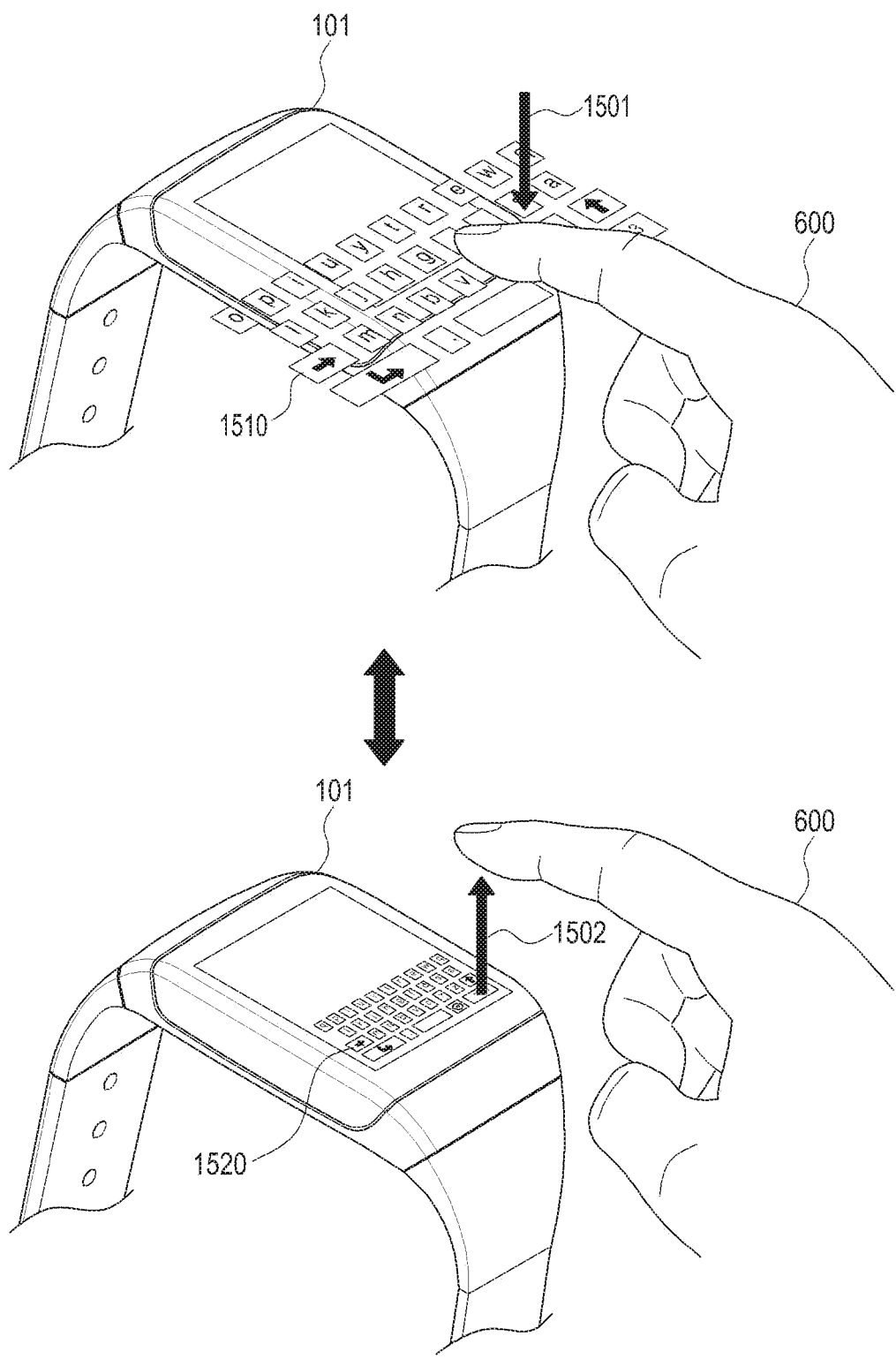
FIG. 15 illustrates a control of an input screen according to an embodiment of the present disclosure.

FIG. 14 is a flowchart illustrating a screen configuration method according to various embodiments of the present disclosure. The screen configuration method of FIG. 14 will be described in more detail with reference to FIG. 15. FIG. 15 illustrates a control of the input screen according to various embodiments of the present disclosure.

Referring to FIG. 14, in operation 1410, the electronic device 101 may acquire a distance between a reference surface and an object.

In operation 1420, the electronic device 101 may determine whether the acquired distance is less than a first threshold. When it is determined that the acquired distance is greater than or equal to the first threshold, the electronic device 101 may display the output screen in operation 1430.

When it is determined that the acquired distance is less than the first threshold, the electronic device 101 may control the input screen based on the acquired distance in operation 1440. In operation 1450, the electronic device 101 may display the controlled input screen.

For example, Referring to FIG. 15, the electronic device 101 may control the size of the input screen 1510 or 1520 based on the distance between the electronic device 101 and the object 600.

According to an embodiment of the present disclosure, as the acquired distance is relatively small, the electronic device 101 may control the size of the input screen 1510 to be relatively large. Further, as the acquired distance is relatively large, the electronic device 101 may control the size of the input screen 1520 to be relatively small.

Referring to FIG. 15, the user may input a down gesture 1501 of making the object 600 approach the electronic device 101. The distance between the object 600 and the electronic device 101 may decrease and, accordingly, the electronic device 101 may display and gradually enlarge the size of the input screen 1510.

Referring to FIG. 15, the user may input an up gesture 1502 of making the object 600 move away from the electronic device 101. The distance between the object 600 and the electronic device 101 may increase and, accordingly, the electronic device 101 may display and gradually reduce the size of the input screen 1520.

Meanwhile, as described above, the electronic device 101 may change the first threshold to the second threshold while starting displaying the input screen 1520. Accordingly, a control space of the input screen 1520, which can be used by the user, may be enlarged, and thus a gesture input for zoom-in or zoom-out may be more easily made.

Figure 16:
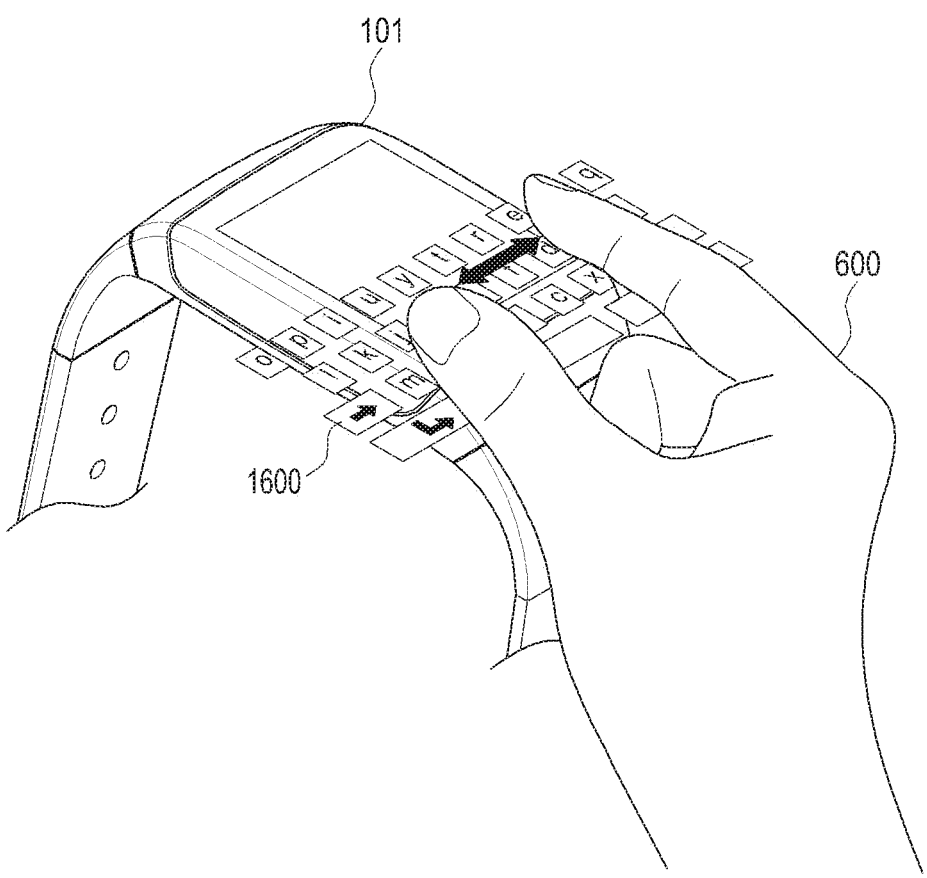
FIG. 16 illustrates an input screen control according to various embodiments of the present disclosure.

FIG. 16 illustrates an input screen control according to various embodiments of the present disclosure.

Referring to FIG. 16, the electronic device 101 may display an input screen 1600. The electronic device 101 may display the input screen 1600 based on a distance between the object 600 and the electronic device 101. The electronic device 101 may update a first threshold to a second threshold based on the displaying of the input screen 1600. Accordingly, the user may input various gestures within an acceptable range of the second threshold.

For example, as illustrated in FIG. 16, the user may input a pinch-out gesture 1605. The electronic device 101 may sense the input pinch-out gesture 1605. The pinch-out gesture 1605 may be input after the object 600 contacts the display (or touch screen). The electronic device 101 may sense the pinch-out gesture 1605 based on an output value of the touch screen. According to another embodiment, the user may input the pinch-out gesture 1605 within the range of the second threshold while not contacting the electronic device 101. The electronic device 101 may sense the pinch-out gesture 1605 by detecting a motion of the object 600.

The electronic device 101 may display and enlarge the size of the input screen 1600 based on the sensed pinch-out gesture 1605. Meanwhile, although not illustrated, the electronic device 101 may sense a pinch-in gesture (not shown) and display and reduce the size of the input screen 1600 based on the sensed pinch-in gesture.

Figure 17:
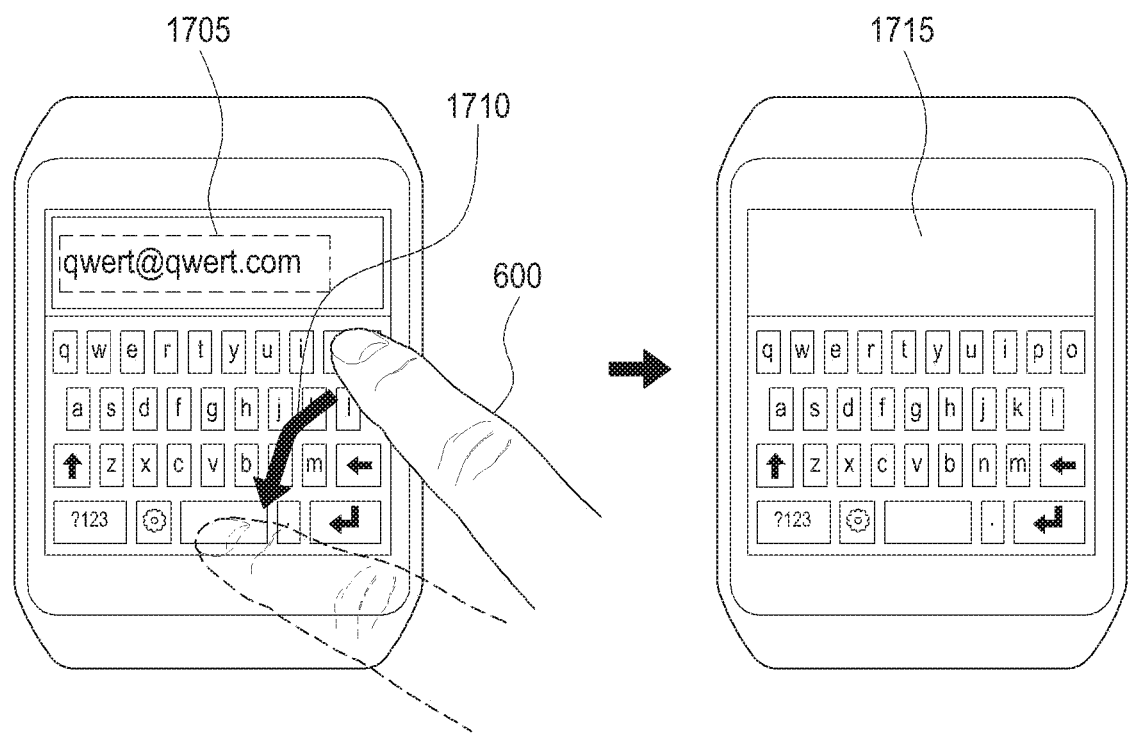
FIG. 17 illustrates an input screen control method according to various embodiments of the present disclosure.

FIG. 17 illustrates an input screen control method according to various embodiments of the present disclosure.

Referring to FIG. 17, the electronic device 101 may display the input screen including a first input window 1705 and an object 600 for inputting on an input device such as a keyboard. The first input window 1705 may be an input window through which, for example, an email address can be input.

The user may input a gesture 1710 of moving the object 600 in a first direction. The electronic device 101 may change the first input window 1705 to a second input window 1715 based on the gesture 1710 and display the second input window 1715. The second input window 1715 may be an input window through which, for example, a password can be input.

An output screen from an application stored in the electronic device 101 may provide a user interface including a plurality of input windows. The user is required to make an input into the input window and input an input window switching gesture to input corresponding information into each of the plurality of input windows. The electronic device 101 according to various embodiments of the present disclosure may perform input window change displaying by the additional gesture 1710 while maintaining the display of the input screen.

Figure 18A:
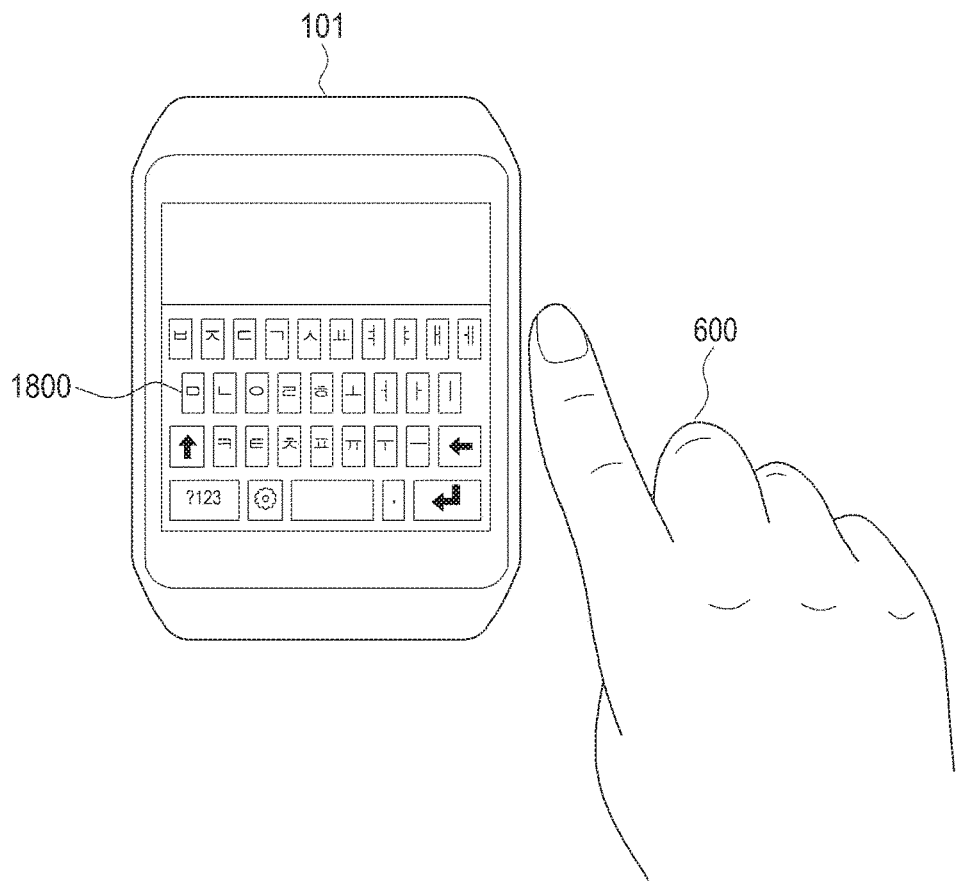
FIGS. 18A and 18B illustrate an input screen control method according to various embodiments of the present disclosure.
Figure 18B:
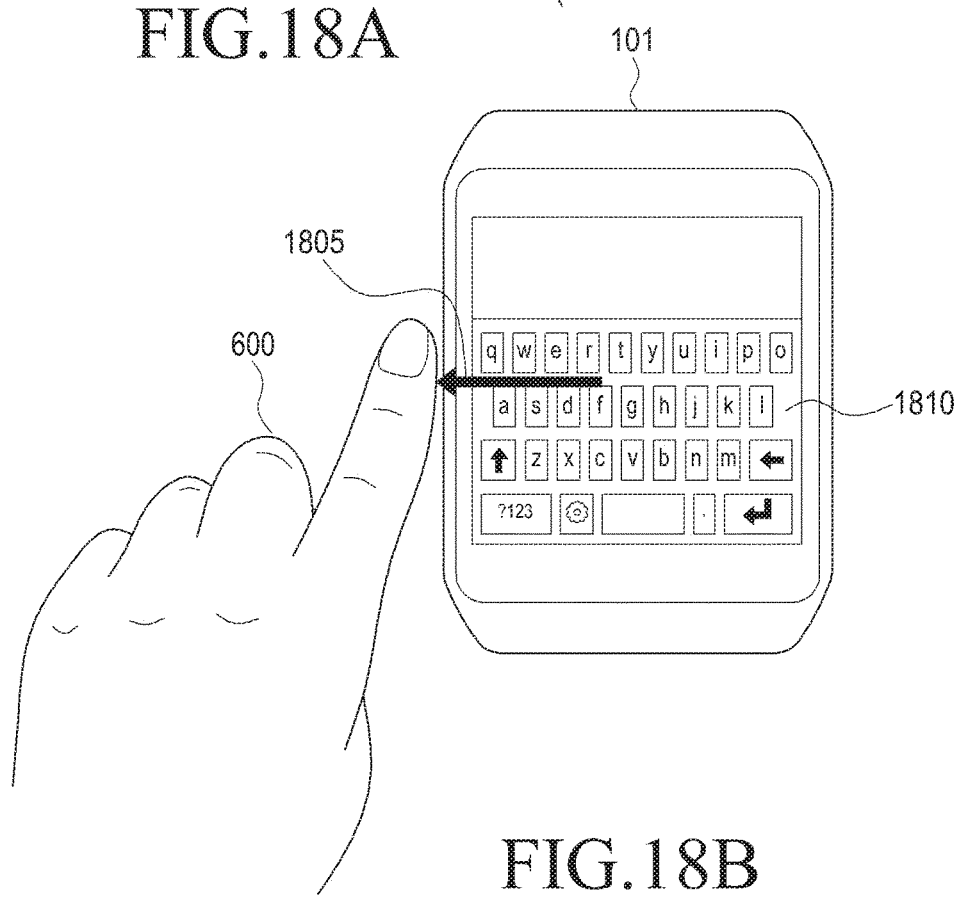

FIGS. 18A and 18B illustrate an input screen control method according to various embodiments of the present disclosure.

Referring to FIGS. 18A and 18B, the electronic device 101 may display an input screen 1800 having a first attribute. The first attribute may be, for example, a "Korean" language attribute.

The user may input a gesture 1805 of moving the object 600 in a first direction. The electronic device 101 may change the input window 1800 having the first attribute to an input window 1810 having a second attribute based on the gesture 1805 and display the input window 1810. The second attribute may be, for example, an "English" language attribute.

Meanwhile, the language attribute is only an example, but it may be easily understood by those skilled in the art that the type of attributes such as a key layout type of the keyboard has no limitation.

Figure 19A:
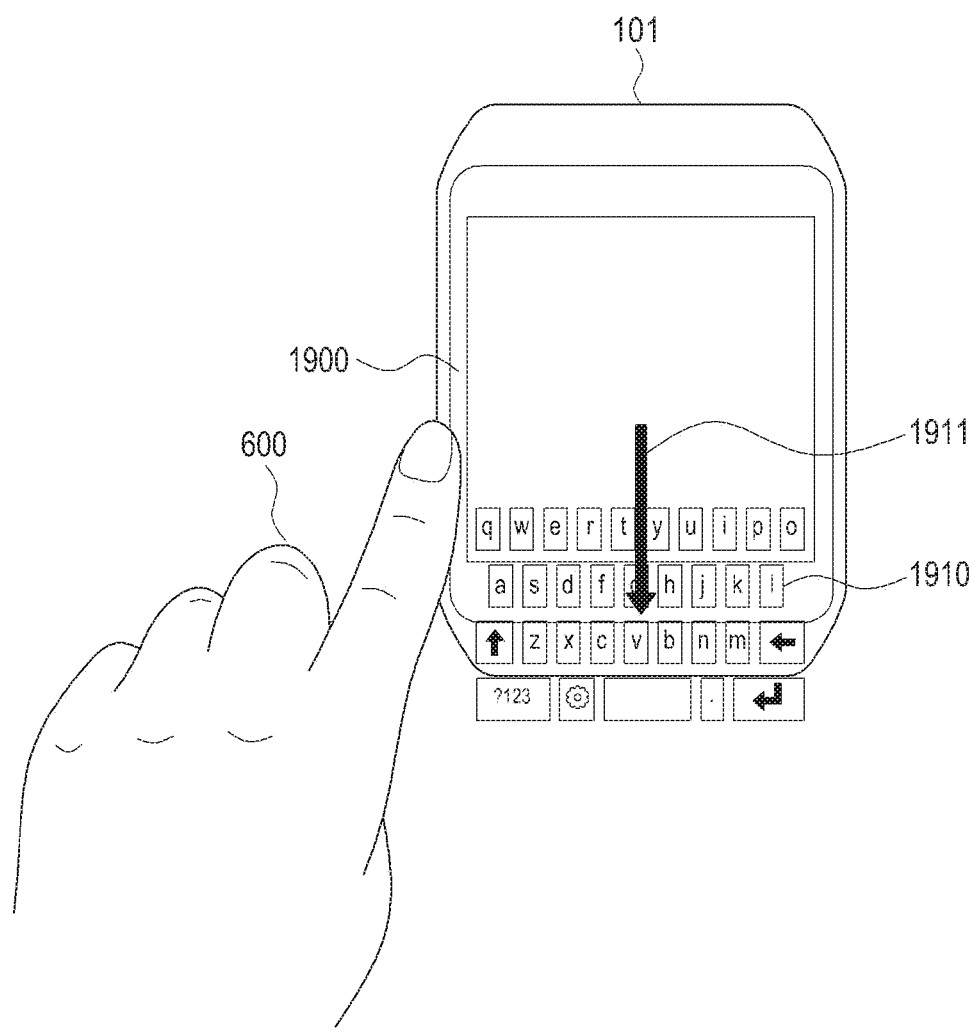
FIGS. 19A and 19B illustrate an input screen control method according to various embodiments of the present disclosure.
Figure 19B:
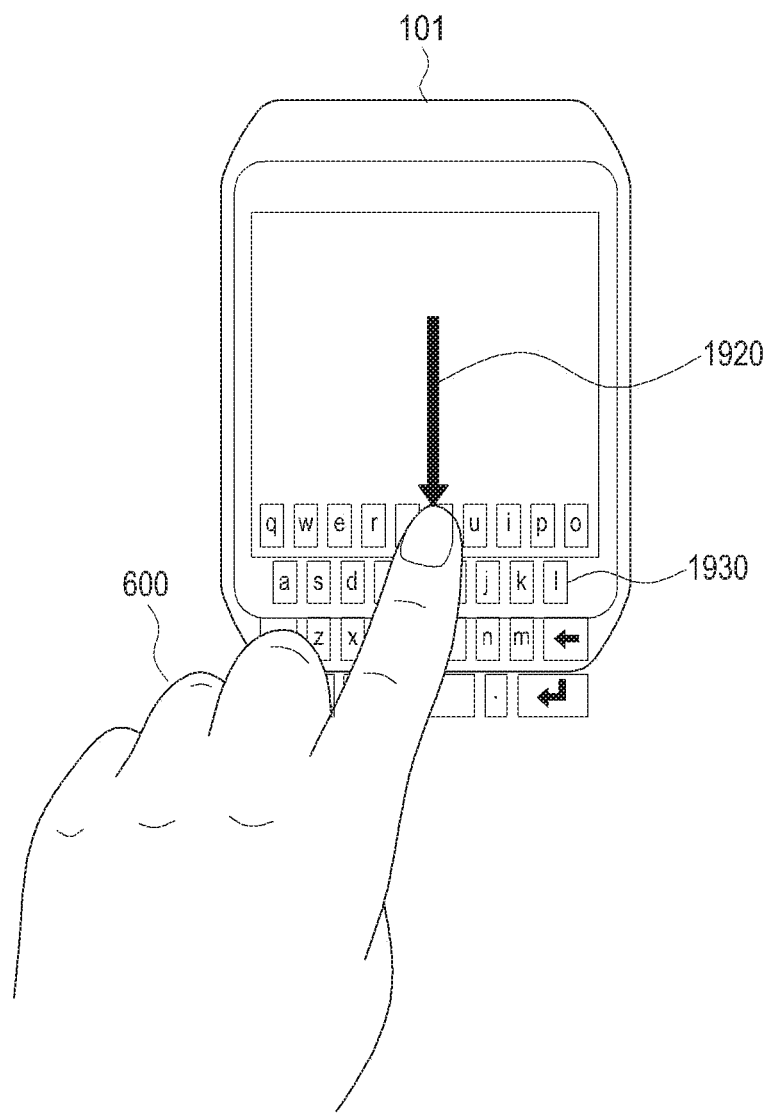

FIGS. 19A and 19B illustrate an input screen control method according to various embodiments of the present disclosure.

Referring to FIG. 19A, the electronic device 101 may display an input screen 1910. The electronic device 101 may sense a touch on a bezel 1900 while displaying the input screen 1910, and stop displaying the input screen 1910 as indicated by reference number 1911 and display an output screen in response to the touch. Further, as described above, when the bezel is touched and a finger approaches, the electronic device 101 may deactivate window switching according to a distance from the finger and maintain the output screen.

Referring to FIG. 19B, the user may input a swipe gesture 1920 of the object 600. The electronic device 101 may stop displaying an input screen 1930 and display an output screen in response to the swipe gesture.

Figure 20:
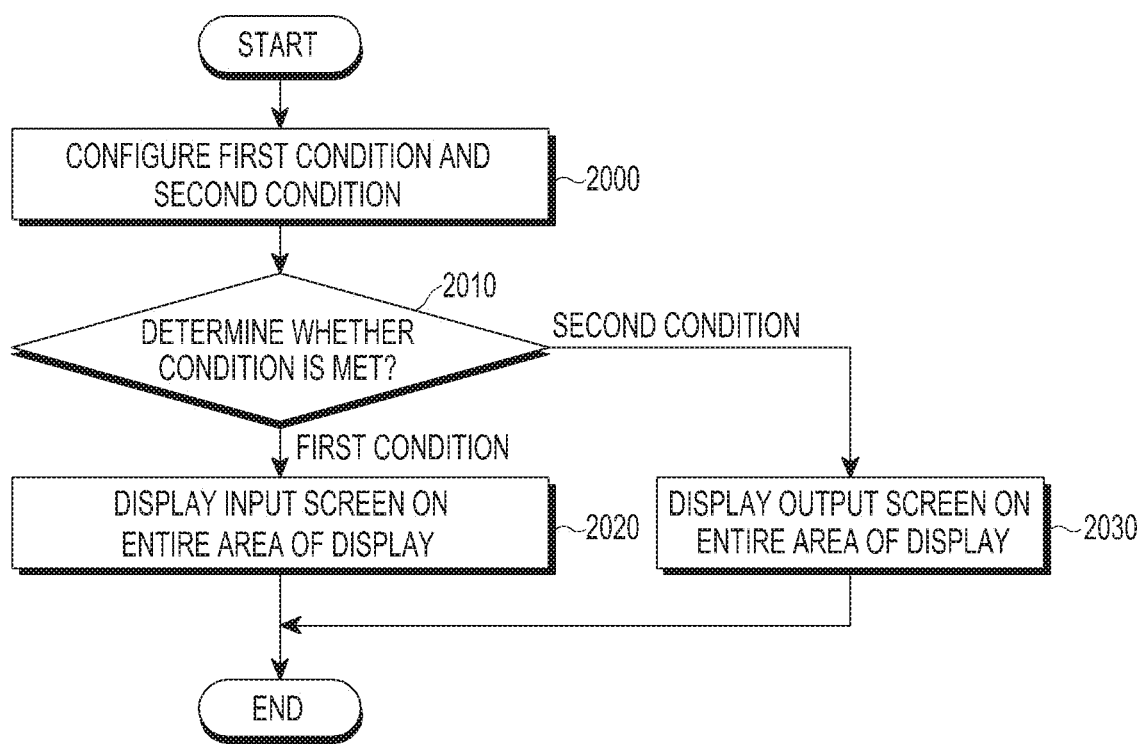
FIG. 20 is a flowchart illustrating a screen configuration method according to various embodiments of the present disclosure.

FIG. 20 is a flowchart illustrating a screen configuration method according to various embodiments of the present disclosure.

Referring to FIG. 20, in operation 2000, the electronic device 101 may configure a first condition and a second condition which is different from the first condition. For example, a screen configuration module of the electronic device 101 may store and execute a program having preset first condition and second condition. For example, the first condition may be a condition having a distance between a reference surface and an object, which is less than a threshold, and the second condition may be a condition having the distance between the reference surface and the object, which is greater than or equal to the threshold. The first condition and the second condition may be conditions based on the distance between the reference surface and the object, but this is only an example. For example, the first condition and the second condition may be based on a voice input, at least one of an acceleration, a speed, and rotatory power of the sensed electronic device 101, various input data or sensing data such as a user history and a pattern of the electronic device 101 by the user.

In operation 2010, the electronic device 101 may determine whether the first condition or second condition are met. When the first condition is met, the electronic device 101 may display the input screen on an entire area of the display in operation 2020. When the second condition is met, the electronic device 101 may display the output screen on an entire area of the display in operation 2030.

According to various embodiments of the present disclosure, a method of configuring a screen may include: acquiring a distance between the electronic device and an object for performing an input into the electronic device; and displaying at least one of an input screen and an output screen on a display of the electronic device based on the acquired distance.

According to various embodiments of the present disclosure, the displaying of at least one of the input screen and the output screen may include displaying the output screen when it is determined that the acquired distance is greater than or equal to a first threshold.

According to various embodiments of the present disclosure, the displaying of at least one of the input screen and the output screen may include displaying the input screen when it is determined that the acquired distance is less than a first threshold.

According to various embodiments of the present disclosure, the method may further include updating the first threshold to a second threshold.

According to various embodiments of the present disclosure, when it is determined that the acquired distance is less than the second threshold, the method may further include continuing the displaying of the input screen.

According to various embodiments of the present disclosure, when it is determined that the acquired distance is greater than or equal to the second threshold, the method may further include switching the input screen to the output screen and displaying the output screen.

According to various embodiments of the present disclosure, the method may further include updating the second threshold to the first threshold.

According to various embodiments of the present disclosure, the method may further include controlling at least one of a size, a form, a position, and an attribute of the input screen.

According to various embodiments of the present disclosure, the displaying of at least one of the input screen and the output screen may include displaying the output screen when it is determined that the acquired distance is equal to or less than a first threshold, and displaying the input screen when it is determined that the acquired distance is greater than the first threshold.

According to various embodiments of the present disclosure, the displaying of at least one of the input screen and the output screen may include displaying the output screen when it is determined that the acquired distance is not included in a first range, and displaying the input screen when it is determined that the acquired distance is included in the first range.

According to various embodiments of the present disclosure, an electronic device may include: a processor that acquires a distance between the electronic device and an object for performing an input into the electronic device; and a display that displays at least one of an input screen and an output screen on the electronic device based on the acquired distance.

According to various embodiments of the present disclosure, the processor may control to display the output screen when it is determined that the acquired distance is greater than or equal to a first threshold.

According to various embodiments of the present disclosure, the processor may control to display the input screen when it is determined that the acquired distance is less than a first threshold.

According to various embodiments of the present disclosure, the processor may update the first threshold to a second threshold.

According to various embodiments of the present disclosure, the processor may control to continue the displaying of the input screen when it is determined that the acquired distance is less than the second threshold.

According to various embodiments of the present disclosure, the processor may control to switch the input screen to the output screen and to display the output screen when it is determined that the acquired distance is greater than or equal to the second threshold.

According to various embodiments of the present disclosure, the processor may update the second threshold to the first threshold.

According to various embodiments of the present disclosure, the processor may control at least one of a size, a form, a position, and an attribute of the input screen.

According to various embodiments of the present disclosure, the processor may display the output screen when it is determined that the acquired distance is equal to or less than a first threshold, and display the input screen when it is determined that the acquired distance is greater than the first threshold.

According to various embodiments of the present disclosure, the processor may display the output screen when it is determined that the acquired distance is not included in a first range, and display the input screen when it is determined that the acquired distance is included in the first range.

According to various embodiments of the present disclosure, a machine-readable storage medium recording a program for executing a method of configuring a screen of an electronic device is provided. The method may include: acquiring a distance between the electronic device and an object for performing an input into the electronic device; and displaying at least one of an input screen and an output screen on a display of the electronic device based on the acquired distance.

According to various embodiments of the present disclosure, a method of configuring a screen of an electronic device may include: configuring a first condition and a second condition for screen configuration of the electronic device; and displaying an input screen on an entire area of a display of the electronic device when the first condition is met and displaying an output screen on the entire area of the display of the electronic device when the second condition is met.

According to various embodiments of the present disclosure, an electronic device may include: a display; and a processor that displays an input screen on an entire area of the display when a first condition is met and displays an output screen on the entire area of the display when a second condition is met.

According to various embodiments of the present disclosure, a method of configuring a screen of an electronic device may include: displaying an output screen on an entire area of a display of the electronic device; identifying that a distance between the electronic device and an object for performing an input into the electronic device enters a value less than a threshold; and displaying an input screen on the entire area of the display.

According to various embodiments of the present disclosure, an electronic device may include: a display that displays an output screen; and a processor that controls to display an input screen on an entire area of the display when it is identified that a distance between the electronic device and an object for performing an input into the electronic device enters a value less than a threshold.

Figure 21:
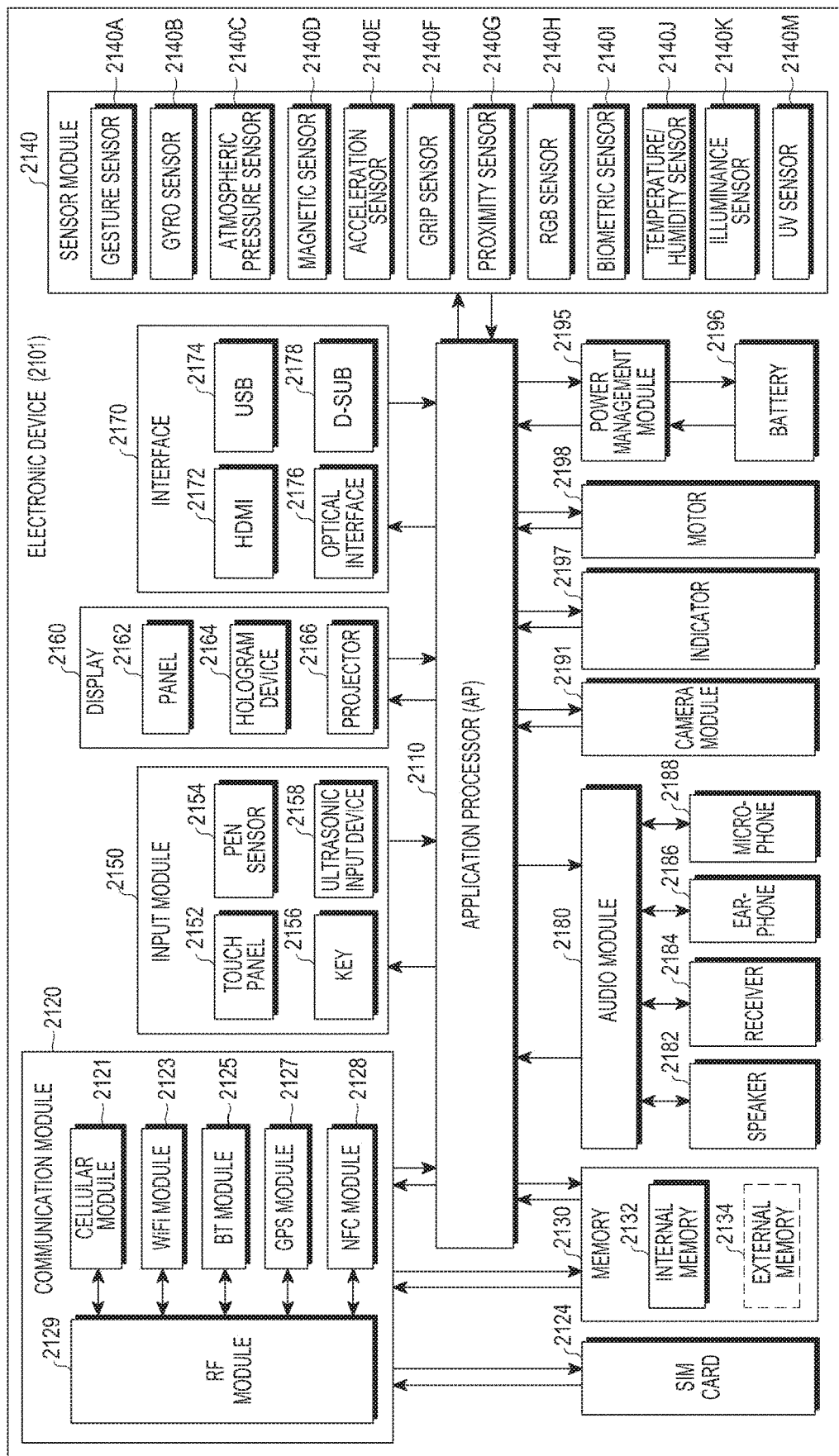
FIG. 21 is a block diagram of an electronic device according to various embodiments of the present disclosure.

FIG. 21 is a block diagram of an electronic device 2101 according to various embodiments of the present disclosure.

Referring to FIG. 21, the electronic device 2101 may include, for example, all or some of the electronic device 101 illustrated in FIG. 1. For example, the electronic device 101 illustrated in FIG. 1 may include all or some of the electronic device 2101 illustrated in 21. The electronic device 2101 may include at least one AP 2110, a communication module 2120, a subscriber identification module (SIM) card 2124, a memory 2130, a sensor module 2140, an input device 2150, a display 2160, an interface 2170, an audio module 2180, a camera module 2191, a power management module 2195, a battery 2196, an indicator 2197, and a motor 2198.

The AP 2110 may control a plurality of hardware or software components connected thereto by driving an operating system or an application program and perform a variety of data processing and calculations. The AP 2110 may be implemented by, for example, a system on chip (SoC). According to an embodiment of the present disclosure, the AP 2110 may further include a graphics processing unit (GPU) and/or an image signal processor. The AP 2110 may also include at least some (for example, a cellular module 2121) of the elements illustrated in FIG. 21. The AP 2110 may load instructions or data, received from at least one other element (for example, a non-volatile memory), in a volatile memory to process the loaded instructions or data and may store various types of data in a non-volatile memory.

The communication module 2120 may have a component equal or similar to the communication module 170 of FIG. 1. The communication module 2120 may include, for example, a cellular module 2121, a Wi-Fi module 2123, a BT module 2125, a GPS module 2127, a near field communication (NFC) module 2128, and a Radio Frequency (RF) module 2129.

The cellular module 2121 may provide a voice call, image call, SMS, or Internet service through, for example, a communication network. According to an embodiment of the present disclosure, the cellular module 2121 may distinguish between and authenticate electronic devices 2101 within a communication network using a SIM (for example, the SIM card 2124). According to an embodiment of the present disclosure, the cellular module 2121 may perform at least some of functions that the AP 2110 may provide. According to an embodiment of the present disclosure, the cellular module 2121 may include a CP.

Each of the Wi-Fi module 2123, the BT module 2125, the GPS module 2127, and the NFC module 2128 may include, for example, a processor for processing data transmitted/received through the corresponding module. According to various embodiments of the present disclosure, at least some (two or more) of the cellular module 2121, the Wi-Fi module 2123, the BT module 2125, the GPS module 2127, and the NFC module 2128 may be included in one integrated chip (IC) or IC package.

The RF module 2129 may transmit/receive, for example, a communication signal (for example, an RF signal). The RF module 2129 may include, for example, a transceiver, a power amp module (PAM), a frequency filter, a low noise amplifier (LNA) or an antenna. According to an embodiment of the present disclosure, at least one of the cellular module 2121, the Wi-Fi module 2123, the BT module 2125, the GPS module 2127, and the NFC module 2128 may transmit/receive an RF signal through a separate RF module.

The SIM card 2124 may include, for example, a card including a subscriber identification module and/or an embedded SIM, and may further include unique identification information (for example, an integrated circuit card identifier (ICCID)) or subscriber information (for example, international mobile subscriber identity (IMSI)).

The memory 2130 may include, for example, an internal memory 2132 or an external memory 2134. The internal memory 2132 may include at least one of a volatile memory (for example, a dynamic random access memory (DRAM), a static RAM (SRAM), a synchronous DRAM (SDRAM), and the like) and a non-volatile memory (for example, a one time programmable read only memory (OTPROM), a programmable ROM (PROM), an erasable and programmable ROM (EPROM), an electrically erasable and programmable ROM (EEPROM), a mask ROM, a flash ROM, a flash memory (for example, a NAND flash memory or a NOR flash memory), a hard disc drive, a solid state drive (SSD), and the like).

The external memory 2134 may further include a flash drive, for example, a compact flash (CF), a secure digital (SD), a micro-SD, a mini-SD, an extreme digital (xD), a memory stick or the like. The external memory 2134 may be functionally and/or physically connected to the electronic device 2101 through various interfaces.

The sensor module 2140 may measure a physical quantity or detect an operation state of the electronic device 2101, and may convert the measured or detected information to an electrical signal. The sensor module 2140 may include, for example, at least one of a gesture sensor 2140A, a gyro sensor 2140B, an atmospheric pressure sensor 2140C, a magnetic sensor 2140D, an acceleration sensor 2140E, a grip sensor 2140F, a proximity sensor 2140G, a color sensor 2140H (for example, red, green, and blue (RGB) sensor), a biometric sensor 2140I, a temperature/humidity sensor 2140J, an illuminance sensor 2140K, and an ultra violet (UV) sensor 2140M. Additionally or alternatively, the sensor module 2140 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 2140 may further include a control circuit for controlling at least one sensor included therein. According to various embodiments of the present disclosure, the electronic device 2101 may further include a processor configured to control the sensor module 2140 as a part of or separately from the AP 2110, and may control the sensor module 2140 while the AP 2110 is in a sleep state.

The input device 2150 may include, for example, a touch panel 2152, a (digital) pen sensor 2154, a key 2156, or an ultrasonic input device 2158. The touch panel 2152 may use at least one of, for example, a capacitive type, an infrared type, and an ultrasonic type. The touch panel 2152 may further include a control circuit. The touch panel 2152 may further include a tactile layer and provide a tactile reaction to the user.

The (digital) pen sensor 2154 may include, for example, a recognition sheet which is a part of the touch panel or a separate recognition sheet. The key 2156 may include, for example, a physical button, an optical key or a keypad. The ultrasonic input unit 2158 may identify data by detecting an acoustic wave with a microphone (for example, a microphone 2188) of the electronic device 2101 through an input unit for generating an ultrasonic signal.

The display 2160 (for example, the display 160) may include a panel 2162, a hologram device 2164 or a projector 2166. The panel 2162 may include a component equal or similar to the display 160 of FIG. 1. The panel 2162 may be implemented to be, for example, flexible, transparent, or wearable. The panel 2162 may also be integrated with the touch panel 2152 as a single module. The hologram device 2164 may show a stereoscopic image in the air by using interference of light. The projector 2166 may project light onto a screen to display an image. For example, the screen may be located inside or outside the electronic device 2101. According to an embodiment of the present disclosure, the display 2160 may further include a control circuit for controlling the panel 2162, the hologram device 2164, or the projector 2166.

The interface 2170 may include, for example, an HDMI 2172, a USB 2174, an optical interface 2176, or a D-sub-miniature (D-sub) 2178. The interface 2170 may be included in, for example, the communication module 170 illustrated in FIG. 1. Additionally or alternatively, the interface 2170 may include, for example, a mobile high-definition link (MHL) interface, an SD card/multi-media card (MMC) interface, or an infrared data association (IrDA) standard interface.

The audio module 2180 may bilaterally convert, for example, a sound and an electrical signal. At least some components of the audio module 2180 may be included in, for example, the input/output interface 150 illustrated in FIG. 1. The audio module 2180 may process voice information input or output through, for example, a speaker 2182, a receiver 2184, earphones 2186, or the microphone 2188.

The camera module 2191 is a device which may photograph a still image and a dynamic image. According to an embodiment of the present disclosure, the camera module 291 may include one or more image sensors (for example, a front sensor or a back sensor), a lens, an image signal processor (ISP) or a flash (for example, LED or xenon lamp).

The power management module 2195 may manage, for example, power of the electronic device 2101. According to an embodiment of the present disclosure, the power management module 2195 may include a power management IC (PMIC), a charger IC, or a battery or fuel gauge. The PMIC may have a wired and/or wireless charging scheme. A magnetic resonance scheme, a magnetic induction scheme, or an electromagnetic scheme may be exemplified as the wireless charging method, and an additional circuit for wireless charging, such as a coil loop circuit, a resonance circuit, a rectifier circuit, and the like may be added. The battery gauge may measure, for example, the remaining amount of battery, a charging voltage and current, or temperature. The battery 2196 may include, for example, a rechargeable battery or a solar battery.

The indicator 2197 may indicate a particular status of the electronic device 2101 or a part thereof (for example, the AP 2110), for example, a booting status, a message status, a charging status, or the like. The motor 2198 may convert an electrical signal into mechanical vibrations, and may generate a vibration or haptic effect. Although not illustrated, the electronic device 2101 may include a processing device (for example, a GPU) for supporting a mobile TV. The processing unit for supporting a mobile TV may process media data according to a standard of digital multimedia broadcasting (DMB), digital video broadcasting (DVB), media flow or the like.

Each of the components of the electronic device according to the present disclosure may be implemented by one or more components and the name of the corresponding component may vary depending on a type of the electronic device. In various embodiments of the present disclosure, the electronic device may include at least one of the above-described elements. Some of the above-described elements may be omitted from the electronic device, or the electronic device may further include additional elements. Further, some of the components of the electronic device according to the various embodiments of the present disclosure may be combined to form a single entity, and thus, may equivalently execute functions of the corresponding elements prior to the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an application-specific IC (ASIC) chip, a field-programmable gate arrays (FPGA), and a programmable-logic device for performing operations which has been known or are to be developed hereinafter.

According to various embodiments of the present disclosure, at least some of the devices (for example, modules or functions thereof) or the method (for example, operations) according to the present disclosure may be implemented by a command stored in a computer-readable storage medium in a programming module form. When the command is executed by one or more processors (for example, the processor 120), the one or more processors may execute a function corresponding to the command. The computer-readable storage medium may be, for example, the memory 130.

The computer readable recoding medium may include a hard disk, a floppy disk, magnetic media (e.g., a magnetic tape), optical media (e.g., a compact disc ROM (CD-ROM) and a DVD), magneto-optical media (e.g., a floptical disk), a hardware device (e.g., a ROM, a RAM, a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, a storage medium having commands stored therein is provided. The commands perform a process to be performed by at least one processor. The process may include: acquiring a distance between the electronic device and an object for performing an input into the electronic device; and displaying at least one of an input screen and an output screen on a display of the electronic device based on the acquired distance.

While the present disclosure has been shown and described with reference to various embodiments thereof, it will be understood by those skilled in the art that various changes in form and details may be made therein without departing from the scope of the present disclosure as defined by the appended claims and their equivalents.

What is claimed is:

1. A wearable device, comprising:
a display;
at least one sensor; and
at least one processor configured to:
 obtain a first distance between the wearable device and a first external object using the at least one sensor,
 obtain a second distance between the first external object and a second external object based on the first distance and a third distance between the wearable device and the second external object, wherein the third distance is obtained using the at least one sensor,
 determine whether the first distance is larger than a first threshold distance with respect to the wearable device and the first external object,
 based on determining that the first distance is less than or equal to the first threshold distance, display, through the display, an output screen of an augmented reality application, wherein the output screen of the augmented reality application includes an additional information related to the second external object different from the first external object, wherein the second external object is not used as an implement for inputting, based on determining that the first distance is larger than the first threshold distance, display, through the display, an input screen of the augmented reality application, wherein the input screen of the augmented reality application includes a virtual keyboard, based on determining that the second distance is larger than a second threshold distance with respect to the first external object and the second external object, display, through the display, the output screen of an augmented reality application, based on determining that the second distance is less than the second threshold distance while the output screen of the augmented reality application is displayed through the display, switch and display, through the display, the input screen from the output screen, and based on the switching and displaying, update the second threshold distance to a third threshold distance with respect to the first external object and the second external object, wherein the third threshold distance is larger than the second threshold distance.

2. The wearable device of claim 1, wherein the at least one sensor includes at least one of an ultrasonic wave sensor, an infrared sensor, an electromagnetic (EM) wave sensor or an electromagnetic resonance (EMR) sensor.

3. The wearable device of claim 1, wherein the wearable device includes a glass type wearable electronic device.

4. The wearable device of claim 1, wherein the at least one processor is further configured to determine whether the first distance is larger than the first threshold distance while the output screen of the augmented reality application is displayed on the display.

5. The wearable device of claim 1, wherein the at least one processor is further configured to, based on determining that the first distance is larger than the first threshold distance, display the input screen of the augmented reality application in place of the output screen.

6. The wearable device of claim 1, wherein the at least one processor is further configured to determine whether the first distance is less than or equal to the first threshold distance while the input screen of the augmented reality application is displayed on the display.

7. The wearable device of claim 1, wherein the at least one processor is further configured to, based on determining that the first distance is less than or equal to the first threshold distance, display the output screen of the augmented reality application in place of the input screen.

8. A wearable device, comprising:
a display;
at least one camera; and
at least one processor configured to:
  obtain an image including a first external object,
  determine a first distance between the wearable device and the first external object based on the image,
  determine a second distance between the first external object and a second external object based on the first distance and a third distance between the wearable device and the second external object, wherein the third distance is determined based on an image including a second external object obtained by the at least one camera,
  determine whether the first distance is larger than a first threshold distance with respect to the wearable device and the first external object,
  based on determining that the first distance is less than or equal to the first threshold distance, display, through the display, an output screen of an augmented reality application, wherein the output screen of the augmented reality application includes an additional information related to the second external object different from the first external object, wherein the second external object is not used as an implement for inputting,
  based on determining that the first distance is larger than the first threshold distance, display, through the display, an input screen of the augmented reality application, wherein the input screen of the augmented reality application includes a virtual keyboard,
  based on determining that the second distance is larger than a second threshold distance with respect to the first external object and the second external object, display, through the display, the output screen of an augmented reality application,
  based on determining that the second distance is less than the second threshold distance while the output screen of the augmented reality application is displayed through the display, switch and display, through the display, the input screen from the output screen, and
  based on the switch and display, update the second threshold distance to a third threshold distance with respect to the first external object and the second external object, wherein the third threshold distance is larger than the second threshold distance.

9. The wearable device of claim 8, wherein the at least one camera includes at least one of a vision camera, a time-of-flight (ToF) camera and a stereo camera.

10. The wearable device of claim 8, wherein the wearable device includes a glass type wearable electronic device.

11. The wearable device of claim 8, wherein the at least one processor is further configured to determine whether the first distance is larger than the first threshold distance while the output screen of the augmented reality application is displayed on the display.

12. The wearable device of claim 8, wherein the at least one processor is further configured to, based on determining that the first distance is larger than the first threshold distance, display the input screen of the augmented reality application in place of the output screen.

13. The wearable device of claim 8, wherein the at least one processor is further configured to determine whether the first distance is less than or equal to the first threshold distance while the input screen of the augmented reality application is displayed on the display.

14. The wearable device of claim 8, wherein the at least one processor is further configured to, based on determining that the first distance is less than or equal to the first threshold distance, display the output screen of the augmented reality application in place of the input screen.

* * * * *